(12) United States Patent
Obendiek

(10) Patent No.: US 7,374,226 B2
(45) Date of Patent: May 20, 2008

(54) FOLDING TOP FOR A CABRIOLET VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 112 days.

(21) Appl. No.: 10/511,058

(22) PCT Filed: Apr. 11, 2003

(86) PCT No.: PCT/DE03/01215

§ 371 (c)(1),
(2), (4) Date: May 2, 2005

(87) PCT Pub. No.: WO03/086800

PCT Pub. Date: Oct. 23, 2003

(65) Prior Publication Data

US 2005/0218691 A1    Oct. 6, 2005

(30) Foreign Application Priority Data

| Apr. 12, 2002 | (DE) | ............................... 102 16 401 |
| Apr. 24, 2002 | (DE) | ............................... 102 18 410 |
| Jul. 3, 2002 | (DE) | ............................... 102 29 808 |
| Sep. 16, 2002 | (DE) | ............................... 102 43 085 |

(51) Int. Cl.
*B60J 7/14* (2006.01)
(52) U.S. Cl. .................. 296/121; 296/108; 296/107.17
(58) Field of Classification Search ................ 296/108, 296/107.09, 107.11, 107.15, 107.16, 107.17, 296/121
See application file for complete search history.

(56) References Cited

U.S. PATENT DOCUMENTS

| 2,897,003 | A | * | 7/1959 | Lelli et al. ................... 296/117 |
| 3,405,970 | A | * | 10/1968 | Doka ......................... 296/117 |
| 5,769,483 | A | * | 6/1998 | Danzl et al. ............ 296/107.08 |
| 5,979,970 | A | * | 11/1999 | Rothe et al. ............ 296/107.17 |
| 6,336,673 | B1 | | 1/2002 | Rothe et al. ............ 296/107.17 |
| 6,419,296 | B2 | | 7/2002 | Ditner et al. ........... 296/107.18 |
| 6,422,637 | B1 | * | 7/2002 | Mac Farland .......... 296/107.15 |
| 6,425,620 | B1 | * | 7/2002 | Schutt et al. ........... 296/107.07 |
| 6,425,621 | B2 | | 7/2002 | Miklosi et al. .............. 296/108 |
| 6,425,622 | B2 | | 7/2002 | Eberle ......................... 296/108 |
| 6,478,362 | B2 | * | 11/2002 | Obendiek .................... 296/108 |
| 6,502,892 | B2 | | 1/2003 | Eberle ......................... 296/108 |

(Continued)

FOREIGN PATENT DOCUMENTS

DE    196 42 152    4/1994

(Continued)

*Primary Examiner*—Dennis H. Pedder
*Assistant Examiner*—Mike Hernandez
(74) *Attorney, Agent, or Firm*—Davidson, Davidson & Kappel, LLC

(57) ABSTRACT

A folding top for a cabriolet vehicle, that includes a first roof part which is embodied as a rigid shell element, a second roof part which is embodied as a rigid shell element, and a forced control unit. The first roof part and the second roof part are pivotable relative to a body of the vehicle, are driven by a common force-introducing unit, and are movable by means of the forced control unit. The forced control unit includes a mechanical control device, by means of which movement of the second roof part can be delayed from movement of the first roof part.

35 Claims, 27 Drawing Sheets

U.S. PATENT DOCUMENTS

| | | | |
|---|---|---|---|
| 6,505,881 B2 * | 1/2003 | Kinnanen | 296/107.17 |
| 6,511,118 B2 | 1/2003 | Liedmeyer et al. | 296/107.17 |
| 6,637,802 B2 * | 10/2003 | Obendiek | 296/108 |
| 6,695,385 B1 * | 2/2004 | Lange | 296/107.12 |
| 6,736,444 B2 * | 5/2004 | Reinsch | 296/107.17 |
| 6,767,045 B2 * | 7/2004 | Reinsch | 296/107.17 |
| 6,799,789 B2 | 10/2004 | Guillez et al. | 296/121 |
| 6,830,283 B2 | 12/2004 | Guillez et al. | 296/108 |
| 6,857,687 B2 * | 2/2005 | Bruder | 296/108 |
| 6,902,223 B2 * | 6/2005 | Hollenbeck et al. | 296/107.09 |
| 6,921,125 B2 * | 7/2005 | Netzel et al. | 296/108 |
| 7,004,531 B2 * | 2/2006 | Obendiek | 296/108 |
| 7,182,389 B2 * | 2/2007 | Bruder et al. | 296/108 |
| 2001/0006297 A1 | 7/2001 | Dintner et al. | 296/107.17 |
| 2001/0019213 A1 | 9/2001 | Eberle | 296/108 |
| 2001/0040385 A1 | 11/2001 | Obendiek | 296/108 |
| 2003/0080579 A1 | 5/2003 | Reinsch | 296/107.17 |
| 2003/0085587 A1 | 5/2003 | Reinsch | 296/107.17 |
| 2004/0046417 A1 | 3/2004 | Guillez et al. | 296/121 |
| 2004/0051342 A1 | 3/2004 | Guillez et al. | 296/108 |
| 2004/0108748 A1 * | 6/2004 | Obendiek et al. | 296/108 |

FOREIGN PATENT DOCUMENTS

| | | |
|---|---|---|
| DE | 43 16 485 | 11/1994 |
| DE | 4435222 | 11/1995 |
| DE | 196 42 153 | 4/1998 |
| DE | 19805477 | 8/1999 |
| DE | 198 46 006 | 4/2000 |
| DE | 299 13 486 | 12/2000 |
| DE | 19934673 | 1/2001 |
| DE | 19932503 | 2/2001 |
| DE | 19957427 | 3/2001 |
| DE | 10006290 | 5/2001 |
| DE | 10006296 | 5/2001 |
| DE | 19964029 | 5/2001 |
| DE | 19962070 | 7/2001 |
| DE | 10108493 | 9/2001 |
| DE | 100 39 680 | 3/2002 |
| DE | 10039683 | 3/2002 |
| DE | 299 24 266 | 8/2002 |
| DE | 10119069 | 3/2003 |
| EP | 1 092 579 | 4/2001 |
| EP | 1 112 879 | 7/2001 |
| EP | 1 308 333 | 5/2003 |
| FR | 2 819 757 | 7/2002 |
| FR | 2 820 692 | 8/2002 |
| WO | WO 02/49864 | 6/2002 |

* cited by examiner

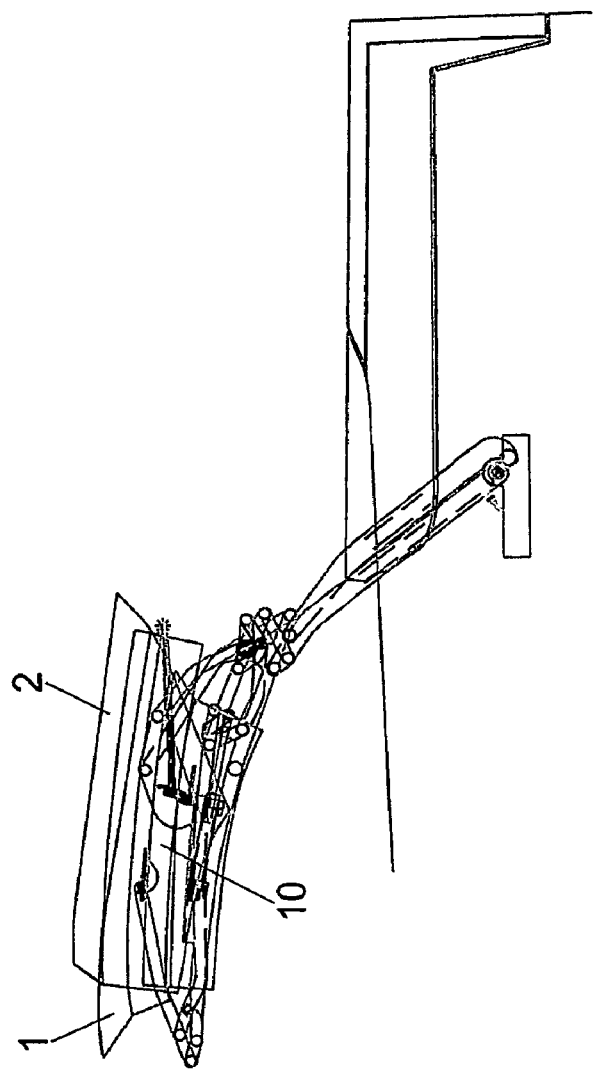
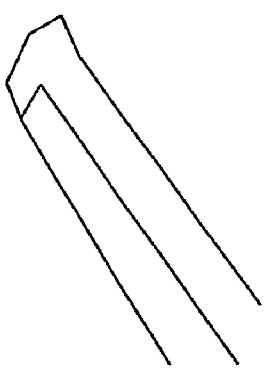
Fig. 12

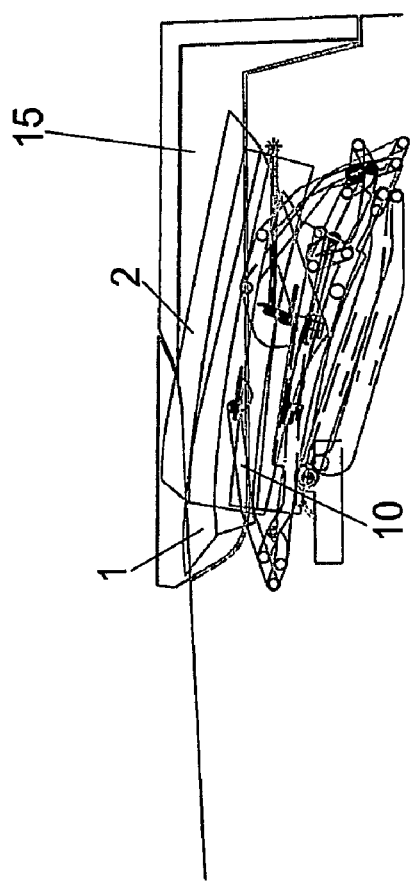
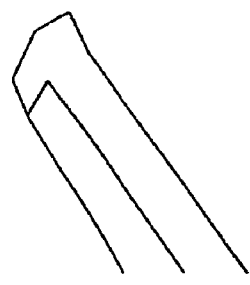
Fig. 14

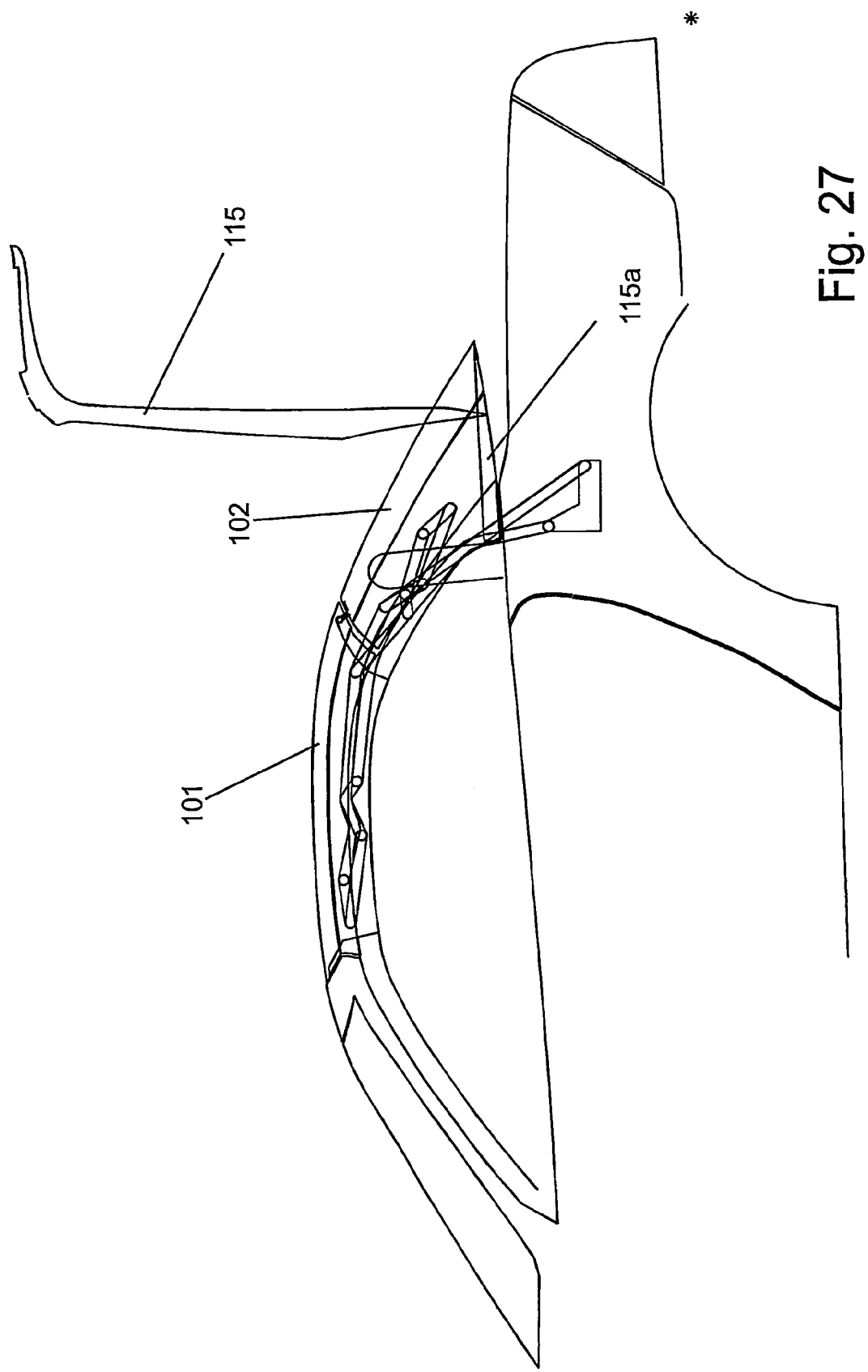

FOLDING TOP FOR A CABRIOLET VEHICLE

The invention relates to a folding top for a cabriolet vehicle.

BACKGROUND

The modern construction of folding cabriolet tops which consists of a plurality of solid roof parts, and can be stowed automatically in a rear region of the vehicle, is generally accompanied by the problem of rigid parts which can be moved extensively in relation to one another. In respect of the configuration of the relative sizes of the roof parts, of the movement sequence of the roof parts in relation to one another, of the dimensions of the collapsed and stowed roof and of the outlay in relation to the drive devices which are to be provided, in terms of the number and associated costs thereof, a set of simultaneously fulfillable boundary conditions is often desirable. Thus, in the case of a number of particularly preferred embodiments of multi-part hard-shell tops, the overlapping of the movements of different roof parts in space results, for example, in it only being possible for these roof parts to be pivoted sequentially, or quasi-sequentially, without colliding with one another.

It is known, from the construction of hard-shell tops, to provide separate drive devices for different roof parts in order to achieve sequential pivoting of the different roof parts in each case.

In order to release a stowage space for the folding top in the rear region during an opening movement, use is often made of a rear element which can be pivoted open counter to the direction of travel, possibly for a rear-window shelf arranged in front of the rear element being provided in a separately pivotable manner in order to achieve a collision-free movement sequence. The pivoting of the rear-window shelf here allows the rear roof part to move into the stowage space.

DE 44 35 222 C1 describes a folding top in which the rear roof part is pivoted open, in the first instance, in the direction of travel, whereupon the rear element can be opened counter to the direction of travel without a separately pivotable rear-window shelf necessarily having to be provided. The disadvantage with the solution presented here is that both the rear roof part and a central roof part, which adjoins the rear roof part in the direction of travel, are articulated separately in each case on the bodywork of the vehicle. In order not to collide with the central roof part during pivoting in the direction of travel, the articulations of the rear roof part comprise extendable hydraulic cylinders in order to raise the rear roof part over the central roof part. Such activation is not just complex and costly, but also susceptible to malfunctioning. In addition, it is necessary to have further means for fixing the rear roof part when the folding top is closed since the hydraulic cylinders which, at the same time, form bearing links of the roof part, are not readily routed in their longitudinal direction. In order to do away with an even greater number of drive arrangements, it is proposed to lock the rear roof part to the central roof part in a position in which it has been pivoted over the central roof part. In respect of automated folding-top opening, however, it is also necessary to have high-outlay hydraulic or electromechanical means for this purpose.

DE 100 06 296 C1 describes a three-part hard-shell top for a cabriolet vehicle in which a central roof part is connected to a bodywork of the vehicle by means of a link mechanism, both a front roof part and a rear roof part being mounted on the central roof part in each case via link mechanisms, and it being possible for the front roof part to be moved over the central roof part and for the rear roof part to be moved beneath the front roof part and over the central roof part. Such an arrangement provides for unfavorable stacking of the roof parts and, if at all, can only be realized in the manner presented, with essentially planar roof parts. If, for example, the rear roof part comprises C-pillars of the vehicle, or if the roof parts are to be stacked in a different order, then the technical realization quickly comes up against limitations, at least when as large a proportion of the roof-part movements as possible take place in a positively controlled manner in relation to one another.

SUMMARY OF THE INVENTION

An object of the present invention is to provide a folding top for a cabriolet vehicle according to the preamble of claim 1 and/or claim 17 in the case of which the flexibility of the positively controlled movement of roof parts in relation to one another is increased.

The present invention provides a folding top for a cabriolet vehicle that includes a first roof part including a rigid shell part and being pivotable with respect to a bodywork of the vehicle; a second roof part including a rigid shell part and being pivotable with respect to the bodywork; a positive control means including a mechanical control device; and a common-force-introduction unit configured to driveably move the first and second roof parts using the positive control means, wherein the control device is configured to enable a delay a movement of the second roof part with respect to a movement of the first roof part.

A mechanical control device is advantageously provided here in a positively controlled connection of a first and a second roof part, with the result, that on the one hand, the roof parts can be moved simultaneously by means of just a single drive device and, on the other hand, the mechanical control device allows coordination of the movement of the roof parts, in particular a temporal sequential or quasi-sequential sequence of the individual movements without any additional drives being required. In particular, doing away with additional drives, in addition to reducing costs, ensures that the mechanics of the folding top as a whole are less susceptible to malfunctioning.

A folding top according to the invention additionally achieves the situation where an opening movement of a front or central roof part can begin before the first roof part has moved all the way over the front or central roof part, with the result that a particularly time-saving opening movement can be realized overall.

In a preferred embodiment of a folding top according to the invention, the control device comprises a rotary link. A single force-introduction unit particularly preferably drives the rotary link, and the rotary link is connected to the first roof part via a first linkage and to the second roof part via a second linkage. It is thus possible to transmit a given way of the force-introduction unit in accordance with the principle of a projected circular movement onto the first and the second linkages, with a phase shift in each case. Starting from a closed folding-top position, it is thus possible to drive, in the first instance, the first linkage and thus the first roof part, whereas the second linkage, and thus the second roof part, is noticeably driven only once the rotary link has been rotated. If the angular position alpha of the rotary link in the starting position is called zero degrees, then, in a first approximation, it is possible for a factor which can be achieved in the transmission of the displacement for the first linkage to be proportional to sine (alpha+delta) and for the factor for the transmission of the displacement of the second linkage to be proportional to sine (alpha+delta+phi), where the phase shift phi is preferably in the order of magnitude of ninety degrees and delta is a constant, predetermined angle of origin. Delta can preferably differ from zero and, in particular, be somewhat smaller than zero, in order that there is a large transmission factor for the first linkage for as long as possible at the start of the movement operation.

The first roof part is particularly preferably a front roof part, and the second roof part is a rear roof part, of the folding top, a central roof part being arranged between the first roof part and the second roof part when the folding top is closed. It is preferable here for the first roof part to be connected to the central roof part via a front four-bar mechanism, and for the second roof part to be connected to the central roof part via a rear four-bar mechanism.

In particular in the case of the first roof part moving in the opposite direction in relation to the second roof part here, this movement, in addition, being particularly extensive as a result of the four-bar mechanisms, the fact that the invention provides the mechanical control device is advantageous since this makes it possible to achieve a particularly large degree of freedom in the dimensioning of the roof parts and the design of the paths of motion of the roof parts.

The central roof part may advantageously be connected to the bodywork of the vehicle via a main four-bar mechanism, with the result that, during or after pivoting of the first and of the second roof parts over the central roof part, it is possible for the roof parts arranged in a stack to be pivoted together into a rear stowage region by means of the main four-bar mechanism.

At least one link of the front four-bar mechanism particularly advantageously is arranged adjacent the outside of the central roof part when the folding top is closed. This advantageously achieves the situation, in respect of space-saving stowage of the open folding top, where a link which bears the means for activating the first, front roof part may be of particularly short configuration, since the outside link of the front four-bar mechanism allows the front four-bar mechanism to be largely set back relative to the central roof part. In particular, however, this provision of the outside link also results in very advantageous use of the control device, since the outside link ultimately gives rise to particularly space-consuming pivoting of the first roof part which, without the control device, would, in the case of a preferred folding top, result in a collision with the second, rear roof part.

The object of the invention is additionally achieved, for a folding top which is mentioned in the introduction and is in accordance with the preamble of claim 17, by the characterizing features of claim 17.

The present invention additionally provides a folding top that includes a first roof part; a second roof part, the first roof part disposed in front of the second roof part when relative to a direction of travel when the folding top is closed; an openable rear element, the second roof part resting on the rear element from above when the folding top is closed; and a main-link mechanism mounted in a movable manner on the bodywork, wherein the first roof part and the second roof part are mounted on the main-link mechanism and wherein the first roof part is displaceable relative to the main link mechanism.

The second roof part advantageously rests on the rear element with sealing action from above when the folding top is closed and, in a first stage of a folding-top opening movement, can be raised up from the rear element, with the result that, on the one hand, straightforward sealing of the folding top in its rear region is made possible and, on the other hand, it is possible to utilize early release of the rear element for simultaneous movement of the folding-top parts and of the rear element. The rear element can be pivoted open counter to the direction of travel in a particularly straightforward manner here in order to release a rear stowage region for the folding top.

In an advantageous further development of a folding top according to the invention, at least one of the roof parts, but preferably both roof parts, can be displaced in relation to the main-link mechanism. In this way, inter alia, it is possible for the roof parts to form a stack before the stack of roof parts is pivoted into the stowage region by means of the main-link mechanism.

It is advantageous here for the first roof part and the second roof part to be mounted on the main-link mechanism by means of a first and a second link mechanism in each case, with the result that the roof parts can be pivoted in relation to the main-link mechanism and toward one another.

In a particularly straightforward realization of a folding top according to the invention, which is stable in respect of kinematics, at least one of the roof parts is, or also both roof parts are, mounted on a carrying link of the main-link mechanism. Such a carrying link may be, for example, the connecting rod of a straightforward main four-bar mechanism. Depending on the desired folding-top movement, however, it is also possible for the main-link mechanism to be of more complex design, for example to be designed as a seven-bar mechanism. It is possible here for the roof parts, as proposed, to be fitted on a common carrying link at the base or also to be articulated on different links of the main-link mechanism. In the latter case, pivoting of the main-link mechanism, at least to a slight extent, will also give rise to pivoting of the roof parts relative to one another, which, depending on the respective demands, may be desirable.

The roof parts are particularly advantageously connected to one another by a positive control means, with the result that the movement of one roof part gives rise to a movement of the other roof part. The total number of driving devices necessary for the folding top can thus be kept small.

The first roof part can advantageously be moved over the second roof part, for example by virtue of the link mechanisms of the roof part being configured correspondingly, in order to allow a favorable stowage position and stacking sequence of the folding-top parts in the rear region of the vehicle. As an alternative, however, it is also possible for the second roof part to be moved over the first roof part. Which of the possible stacking sequences, which can be realized by just slight modifications, are optimal in each case depends, in particular, on the design-related shape of the bodywork and the folding-top parts.

A folding top according to the invention which is particularly advantageous in respect of stability is one in which a first roof part and a second roof part are mounted on the main-link mechanism in each case via a first and a second link mechanism, it being possible for the roof parts to be moved relative to one another and, in each case, relative to the main-link mechanism. In such a combination, the total displacement which is necessary in the overlapping of the roof parts is distributed fairly uniformly between the two roof parts, with the result that each of the link mechanisms of the roof parts can be kept relatively small. Large link mechanisms in particular have the disadvantage of a lack of stability, which generally has to be compensated for by an undesirably solid configuration of the link parts and articulations.

An additional, third roof part may advantageously also be provided in order to cover over the passenger compartment of large vehicles. Such a third roof part may be arranged, as a central roof part, between the first roof part and the second roof part. In this case, it can be fixed particularly straightforwardly to the abovementioned preferred carrying link.

As an alternative to this, which may be advantageous depending on the desired stacking sequence and predetermined dimensioning of the roof parts, it is also possible, however, for the third roof part to be provided as the front roof part, in which case it can be mounted, in particular, on the first roof part. It can thus be ensured, for example, that, even in the case of a three-part folding top, the second, rear roof part may be arranged as the lowermost roof part of the stacking sequence when the folding top is open.

The positive control means, which couples the movements of the first roof part and the second roof part, can particularly preferably be equipped with a previously described mechanism for delaying the movement of the roof parts in relation to one another. As far as the advantages of such a delaying mechanism are concerned, it is referred to the description above.

Further advantages and features of the folding top according to the invention can be gathered from the exemplary embodiments described hereinbelow and from the claims.

BRIEF DESCRIPTION OF THE DRAWINGS

Two preferred exemplary embodiments of a folding top according to the invention are described hereinbelow and explained in more detail with reference to the attached drawings, in which:

FIG. 12 shows a lateral overall view of the folding top from FIG. 9, FIG. 14 shows the folding top from FIG. 12 in a state in which it has been opened fully and stowed in a rear region of the vehicle, FIG. 27 shows the folding top from FIG. 18, a trunk lid which is integrated in the rear element having been opened.

DETAILED DESCRIPTION

Figure 1:
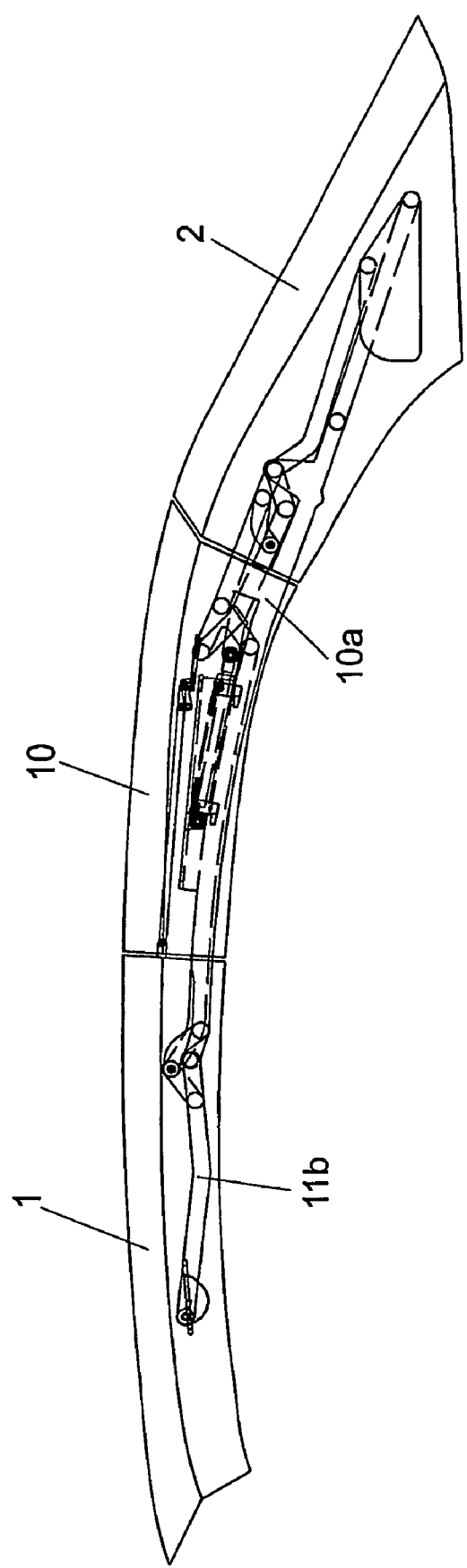
FIG. 1 shows a schematic partial view, from the side, of a first exemplary embodiment of a folding top according to the invention in a closed position.

The first exemplary embodiment of a folding top of the invention according to FIGS. 1 to 17 comprises a first, front roof part 1, a second, rear roof part 2 and a central roof part 10 which, in the closed state, is arranged between the first and the second roof parts 1, 2. The central roof part 10 is fixed to a central link 10a, with the result that the central roof part 10 and the central link 10a may be regarded as a structural unit.

The first roof part 1 is connected to the central roof part 10 via a front four-bar mechanism 11, a front link 11b of the front four-bar mechanism being connected in an articulated manner to the central link 10a, and an outside link 11a of the front four-bar mechanism 11 being articulated on the central roof part 10 from the outside. In the closed state according to FIGS. 1, 2 and 11, the outside link is arranged adjacent the outside of the central roof part 10, the outside link being located in a roof-rail or rain-channel recess of the central roof part 10.

The second, rear roof part 2 is articulated on the central link 10a by means of a rear four-bar mechanism 12. The rear roof part 2 comprises C-pillars of the folding top and a solid rear window. The rear four-bar mechanism 12 comprises a first rear link 12a and a second rear link 12b.

Overall, the first roof part 1 and the second roof part 2 can thus be pivoted over the central roof part 10 in each case, it being possible for the rear roof part 2 additionally to be pivoted over the front roof part 1.

The front four-bar mechanism 11 and the rear four-bar mechanism 12 are connected to one another via a drivable positive control means 4, with the result that a position of the first roof part 1 is clearly associated in each case, in mechanical terms, with a position of the second roof part 2.

The positive control means 4 comprises a first linkage 8, which activates the front four-bar mechanism 11, a second linkage 9, which activates the rear four-bar mechanism 12, and a rotary link 7. The rotary link is connected to the central link 10a such that it can be rotated at a first articulation 7a. The rotary link 7, in addition, can be rotated for driving action by means of a force-introduction unit 5, which is designed as a linear hydraulic cylinder and is supported against the central link 10a. In this case, the rotary link is designed as three-arm link. However, it is also possible, in particular, for a rotary link to be understood, in the sense of the invention, as a rotary plate or control plate. In particular a universally usable perforated plate can also be utilized as a control plate, with the result that, by virtue of articulations being fitted in a variable manner on the perforated plate, it is possible, using standard components, to provide a deceleration-control means which can be adapted to different folding tops.

The first linkage 8 comprises a first, front control link 8a and two front links 8b, 8c, it being possible to achieve a particularly large pivoting angle for the front four-bar mechanism 11 by virtue of the front link 11b being connected to the first control link 8a by means of the two front links 8b, 8c. The first control link 8a is connected to the rotary link 7 at a second articulation 7b of the rotary link 7.

The second linkage 9 comprises a second, rear control link 9a, which is guided in relation to the central link 10a via a small supporting link 9b. The second control link 9a is articulated on an extension of the second rear link 12b, with the result that the rear four-bar mechanism 12 is articulated on the second control link 9a and can be activated via the latter.

The central roof part 10 or the central link 10a is connected to a bodywork-mounted main-bearing unit 14 via a main four-bar mechanism 13, the main four-bar mechanism 13 comprising a first main link 13a and a second main link 13b.

A rear stowage region 16 of the vehicle can be covered over by means of a rear element 15, it being possible for the rear element 15 to be pivoted open counter to the direction of travel in order to release a through-passage space for the folding top which is to be stowed.

Figure 15:
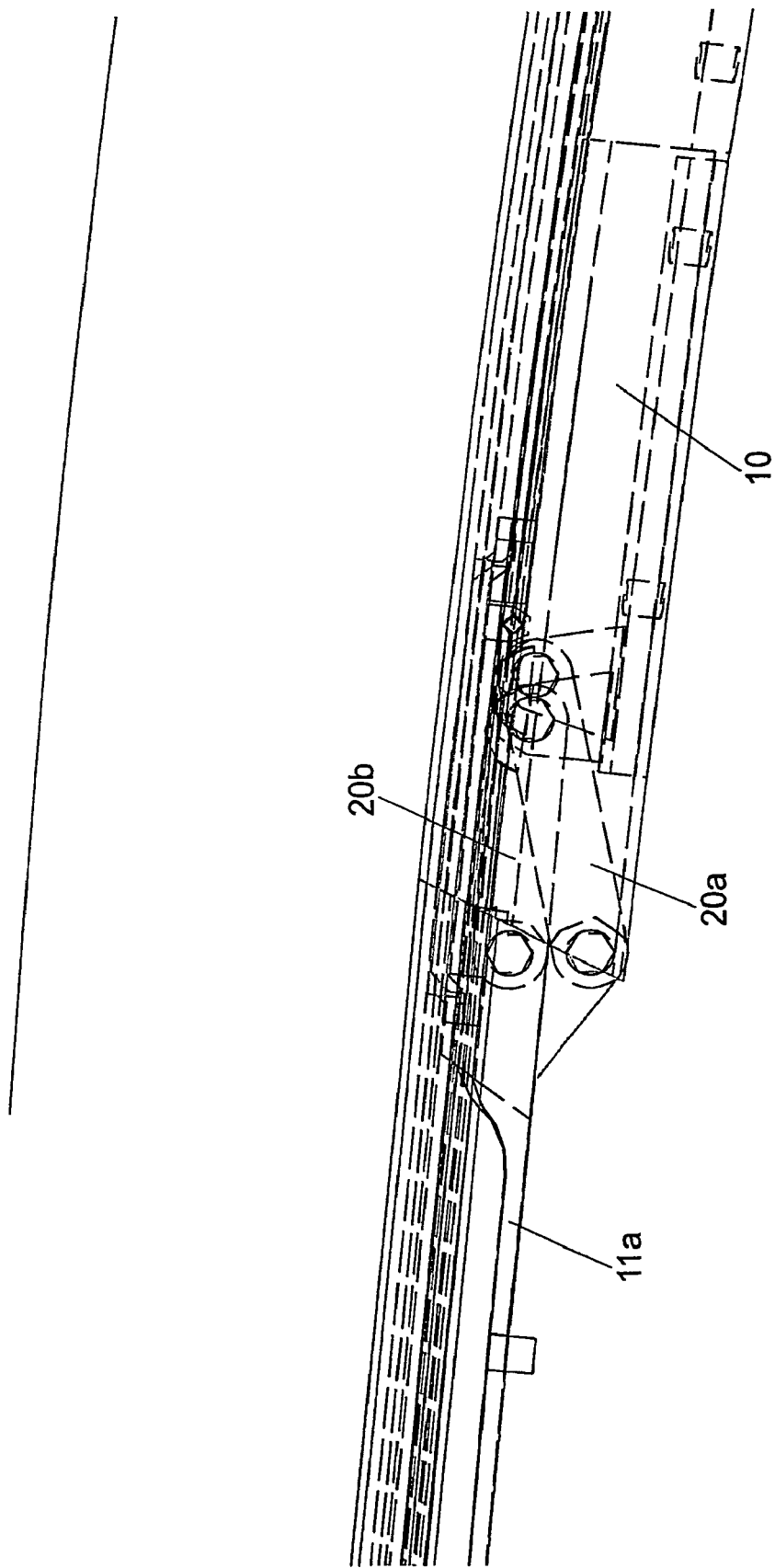
FIG. 15 shows a view, in detail form, of an outside link of the first exemplary embodiment of a folding top according to the invention in a closed position.
Figure 16:
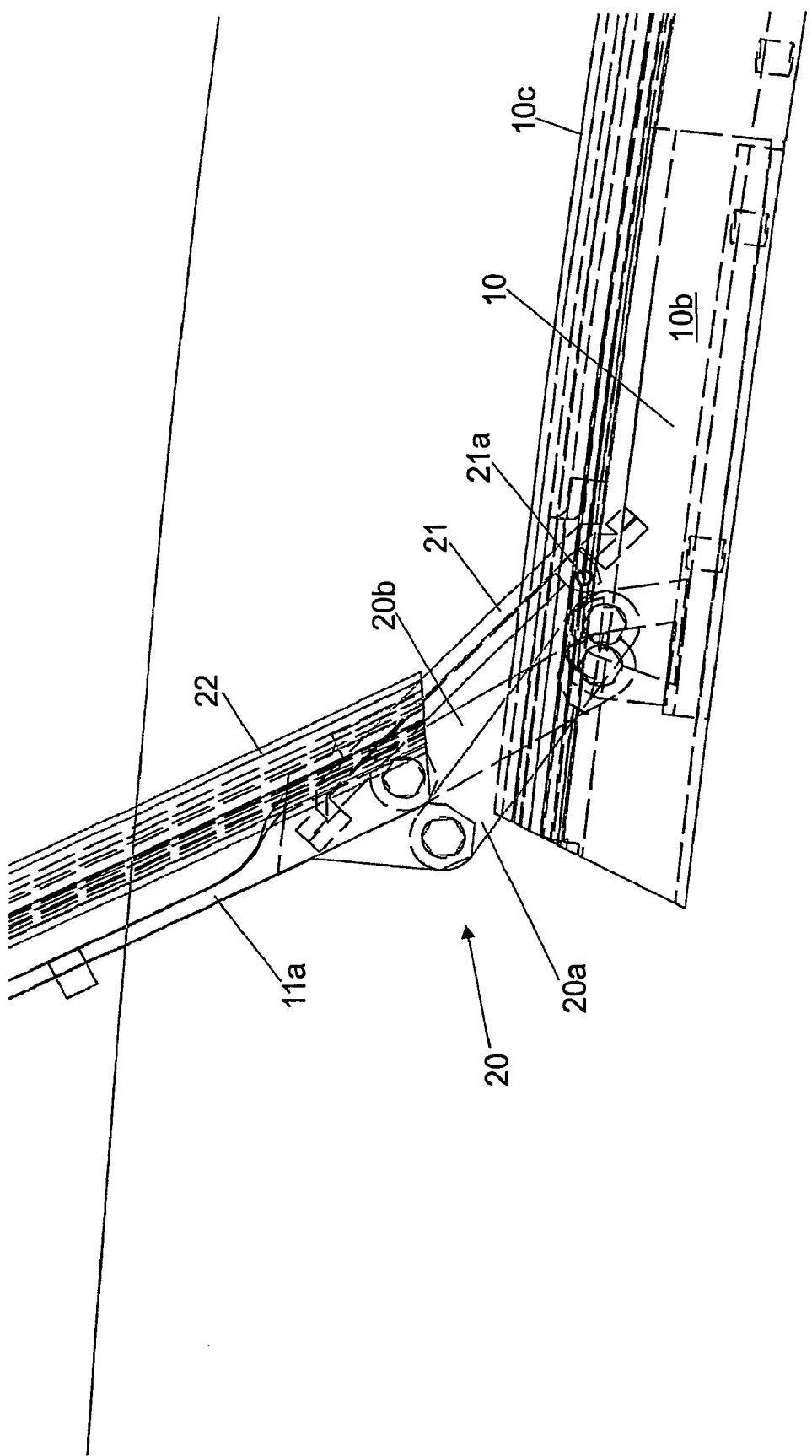
FIG. 16 shows the view, in detail form, from FIG. 15 in a partially open position.
Figure 17:
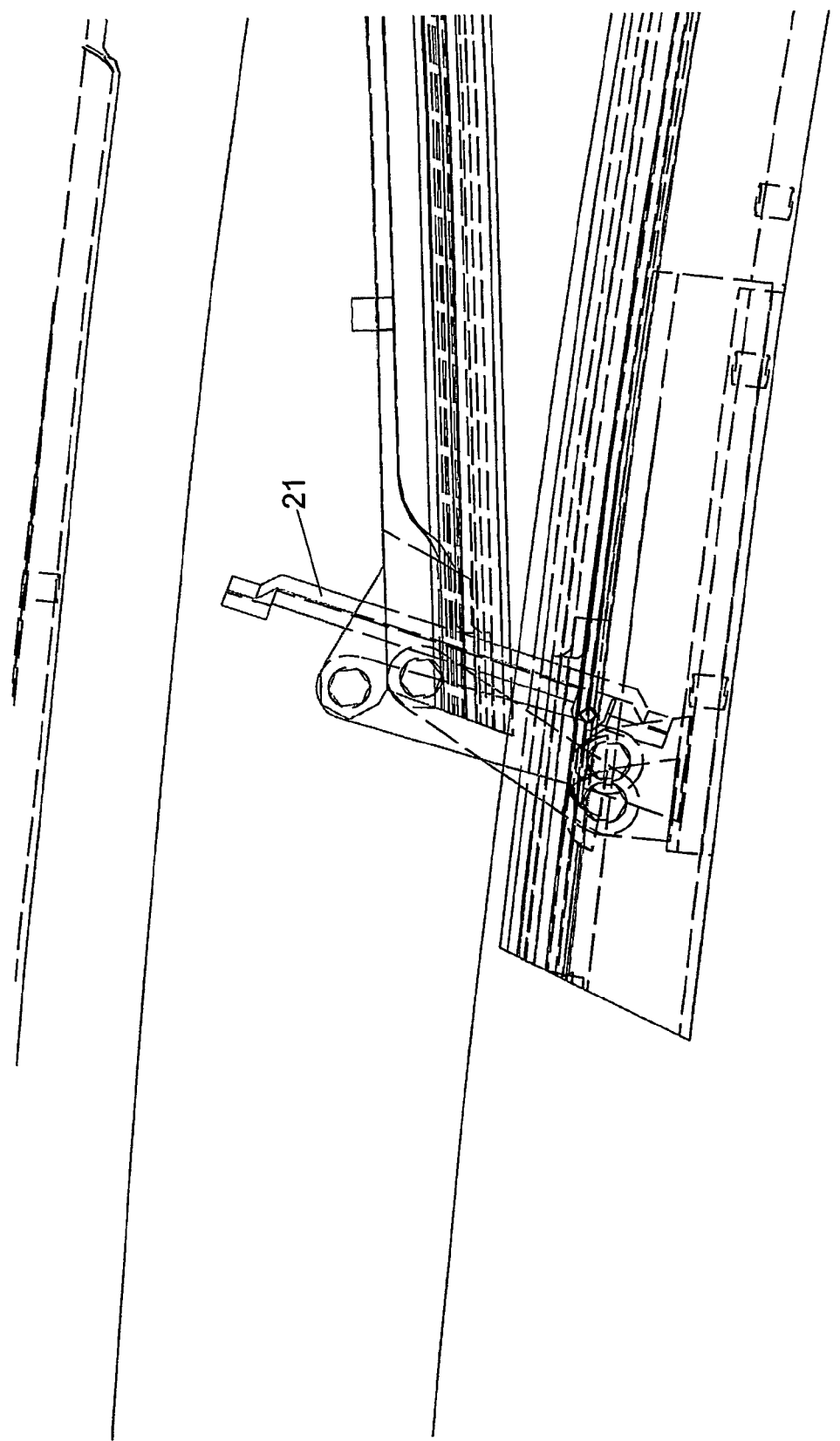
FIG. 17 shows the view, in detail form, from FIG. 15 in a fully open position, with the outside link pivoted to the maximum extent.

As a particularly advantageous detailed solution for the folding top according to the invention which is illustrated in detail, in particular, in FIGS. 15 to 17, the outside link 11a is not articulated on the central roof part 10 via a conventional rotary articulation. Rather, the articulation arrangement comprises a small four-bar mechanism 20, the central roof part 10 forming the base of the small four-bar mechanism 20 and the outside link 11a forming the connecting rod of the small four-bar mechanism 20. A first link 20a and a second link 20b of the small four-bar mechanism 20 cross over one another. A short covering plate 21 can be pivoted along essentially parallel to the links 20a, 20b of the small four-bar mechanism 20 about a dedicated articulation arrangement 21a, the covering plate 21 being guided with sliding action in the region of its end located opposite its articulation arrangement 21a.

In the case of a link being configured as an outside link, account should be taken of a series of special features. As is also the case in the exemplary embodiment shown, an outside link 11a is advantageously arranged in a roof-rail recess 10b, which is provided in any case in most modern folding vehicle tops. The roof-rail recess 10b is laminated with a roof-rail covering 10c outside the region of the link 10a. The outside link 11a expediently comprises a corresponding lamination 22 positioned on the actual link, with the result that, when the folding top is closed, the link is able to give the appearance of a continuous drip molding 10c, 22. Such an arrangement, however, is accompanied by the problem that, on account of being accommodated in a sunken manner in the roof-rail recess 10b, the link 11a would strike against the roof-rail covering 10c during a pivoting movement, at least when a large pivoting angle of the link 11a is necessary. As a result of the advantageous detailed solution for the articulation arrangement of the link in the small four-bar mechanism 20, however, the link 11a, together with its roof-rail cover 22, passes out of the roof-rail recess 10b over its entire length even as it begins to pivot, with the result that a particularly large pivoting angle is made possible. FIGS. 15 to 17 show that a free pivoting angle of the outside link of more or less 180 degrees is thus made possible.

The short covering plate 21, which can be pivoted along with the four-bar mechanism 20, merely serves for covering over the roof-rail region above the small four-bar mechanism 20 when the folding top is closed.

It should be mentioned that the prior art has disclosed solutions in which a recessed, outside link can be covered by means of a strip-like flap which is fitted in a pivotable manner on a roof part and forms a roof-rail cover. In contrast, the solution described has considerable advantages since, for example, the roof-rail cover can be secured directly on the link.

Figure 2:
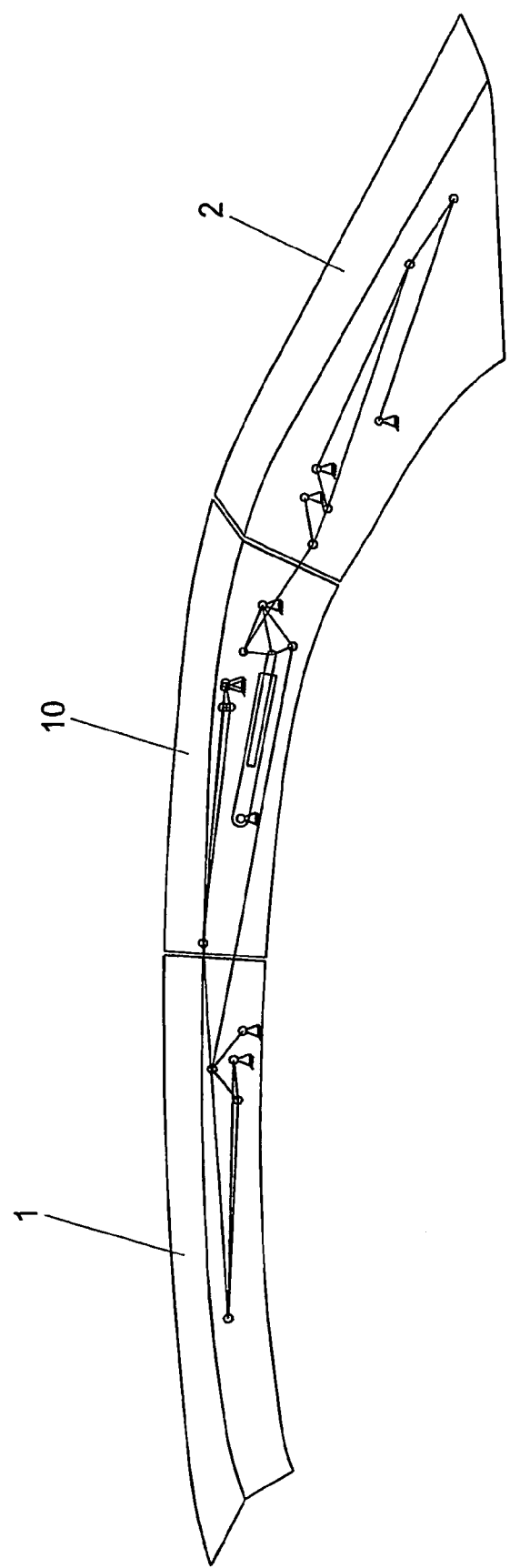
FIG. 2 shows the folding top from FIG. 1 in a basic illustration depicting the interaction of the components.
Figure 3:
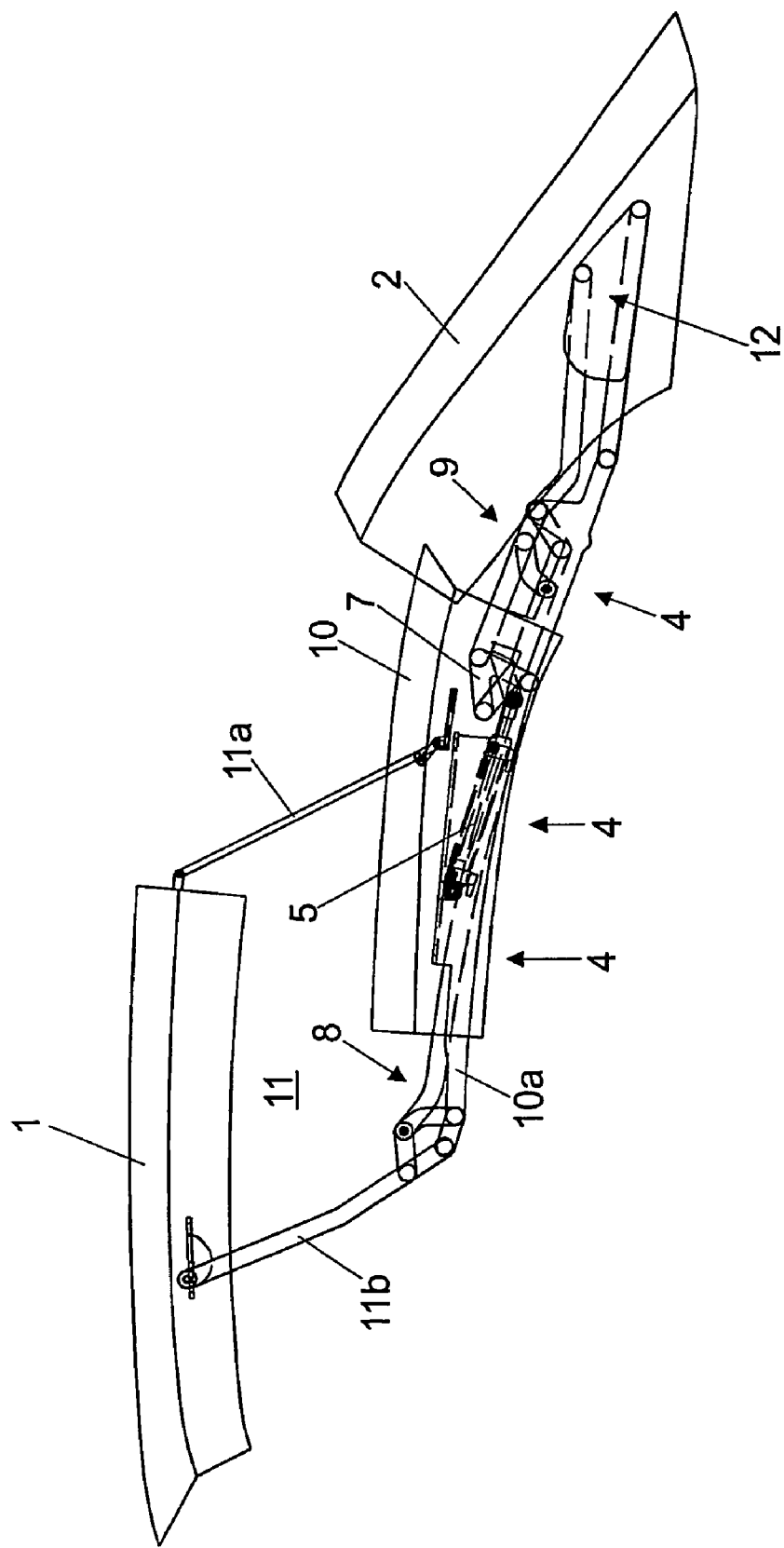
FIG. 3 shows a schematic partial view, from the side, of a first exemplary embodiment of a folding top according to the invention in a first step of an opening movement.
Figure 4:
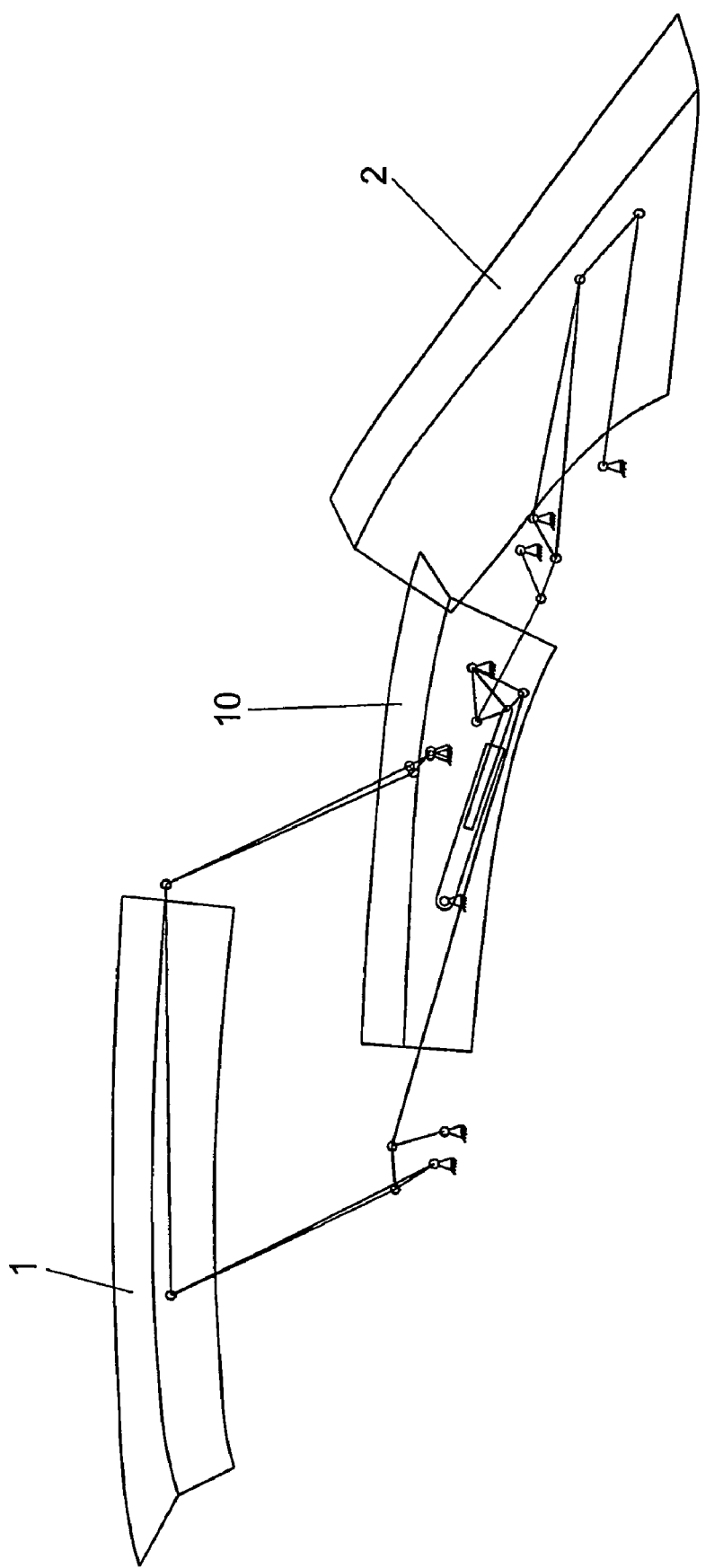
FIG. 4 shows the folding top from FIG. 3 in a basic illustration depicting the interaction of the components.
Figure 10:
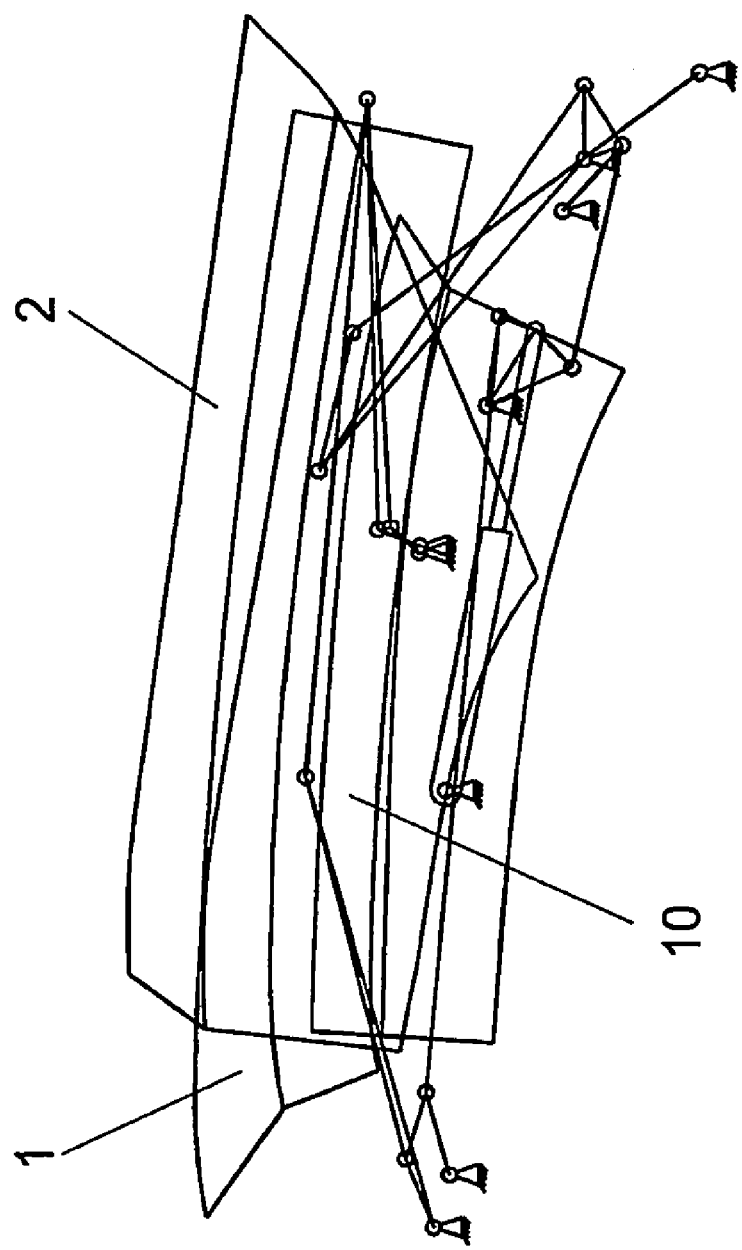
FIG. 10 shows the folding top from FIG. 9 in a basic illustration depicting the interaction of the components.
Figure 11:
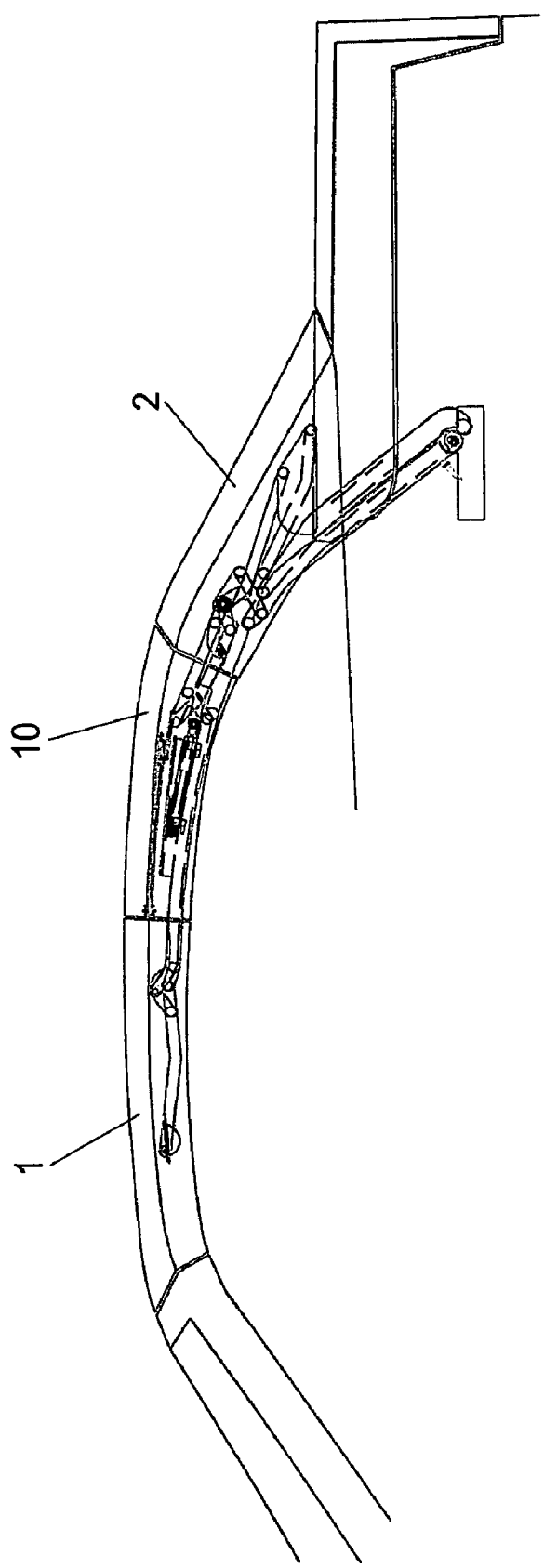
FIG. 11 shows a lateral overall view of the folding top from FIG. 1.

The invention functions, then, as follows:

Starting from the closed state of the folding top according to FIGS. 1, 2 and 11, in the first instance, a first part of a folding-top opening movement is initiated. The force-introduction unit 5 is actuated for this purpose, as a result of which the rotary link 7 is rotated, according to the illustrations, in the counterclockwise direction. A comparison of FIGS. 1 to 10 clearly shows that, in the first instance here, it is predominantly the first linkage 8 which is actuated by the rotary link, whereas, on account of the position of the third articulation 7c in relation to the second linkage 9, the second linkage 9 is barely actuated in the first instance, in particular in the relevant longitudinal direction of the second, rear control link 9a.

Figure 5:
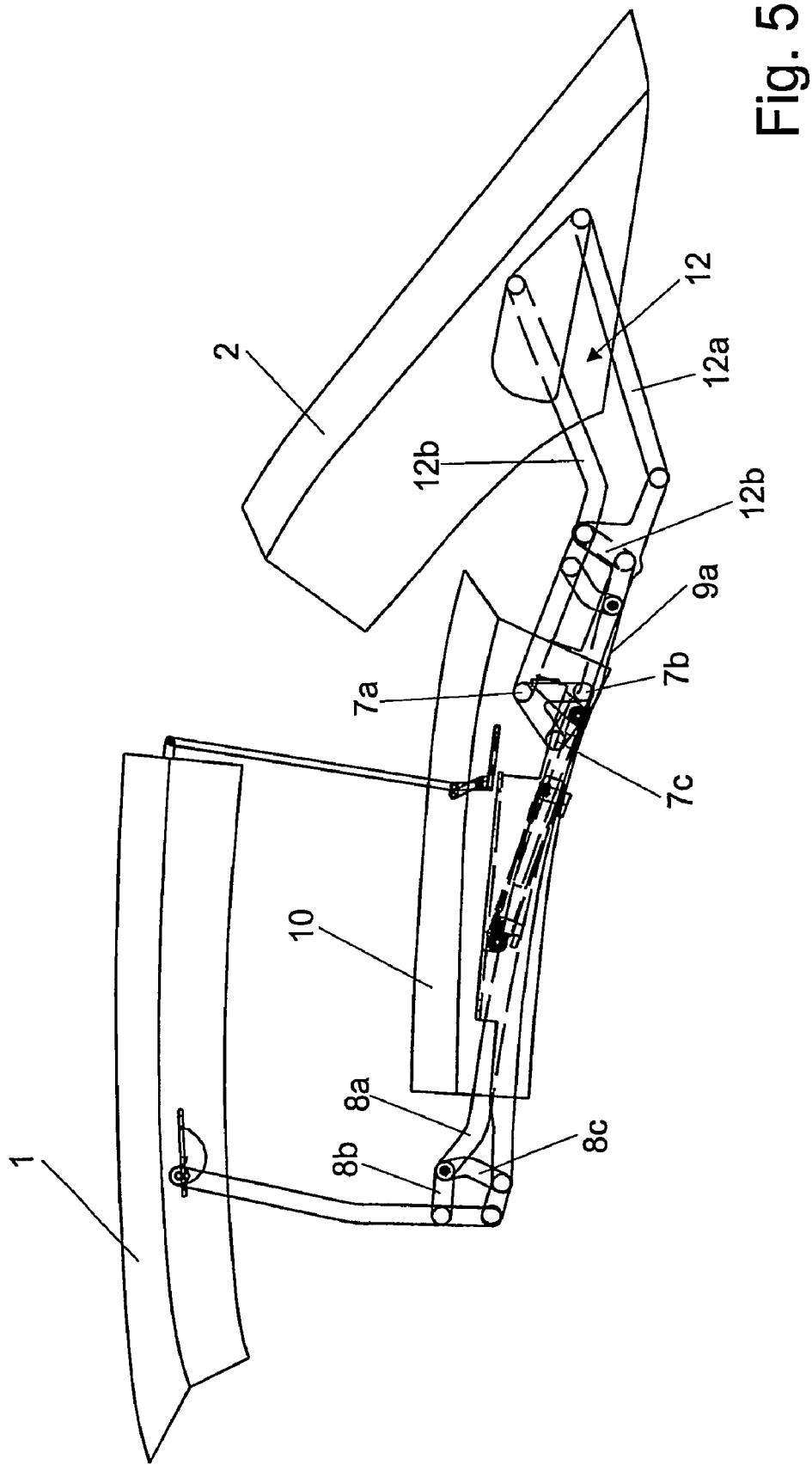
FIG. 5 shows a schematic partial view, from the side, of a first exemplary embodiment of a folding top according to the invention in a second step of an opening movement.
Figure 6:
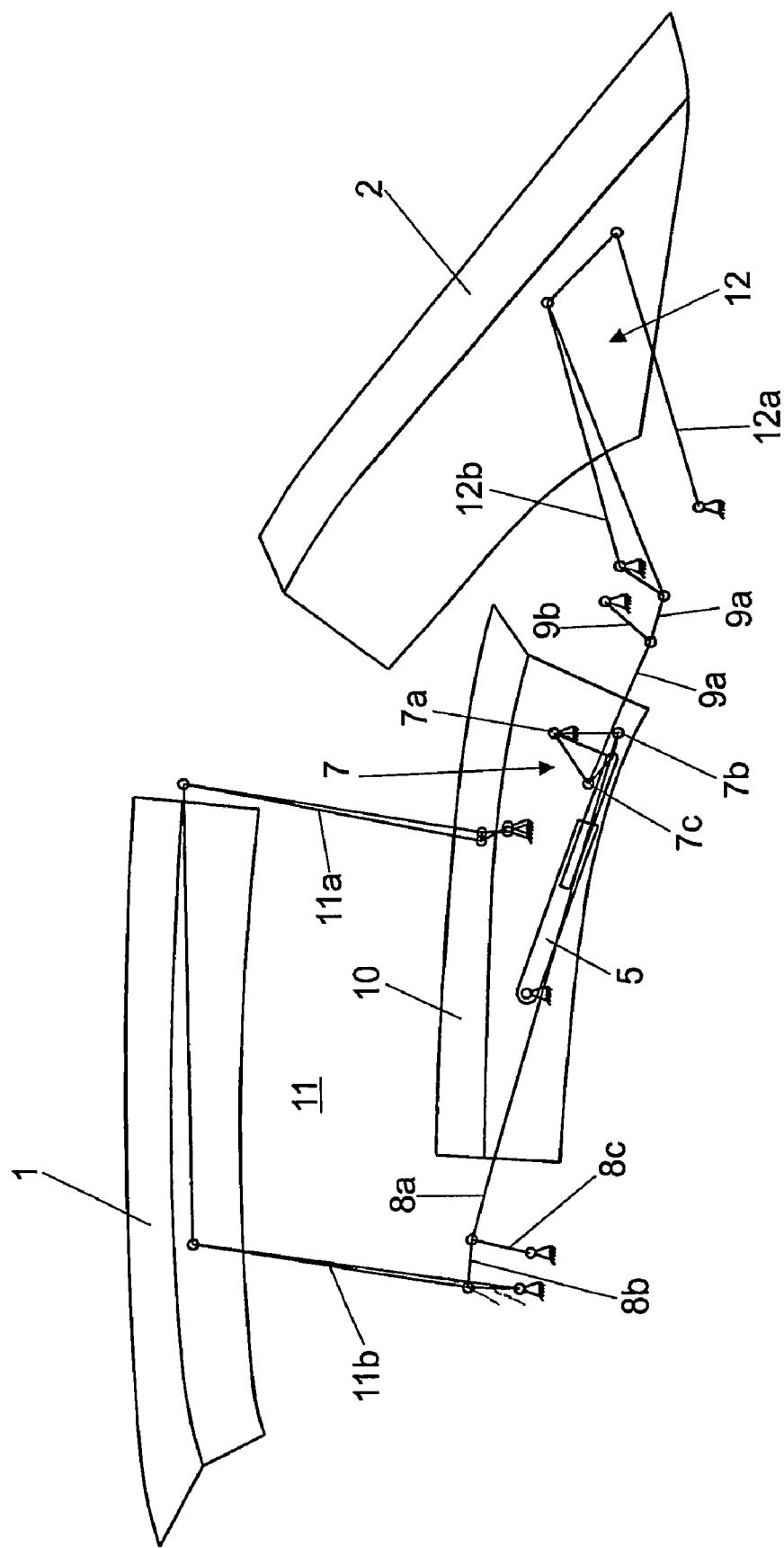
FIG. 6 shows the folding top from FIG. 5 in a basic illustration depicting the interaction of the components.
Figure 7:
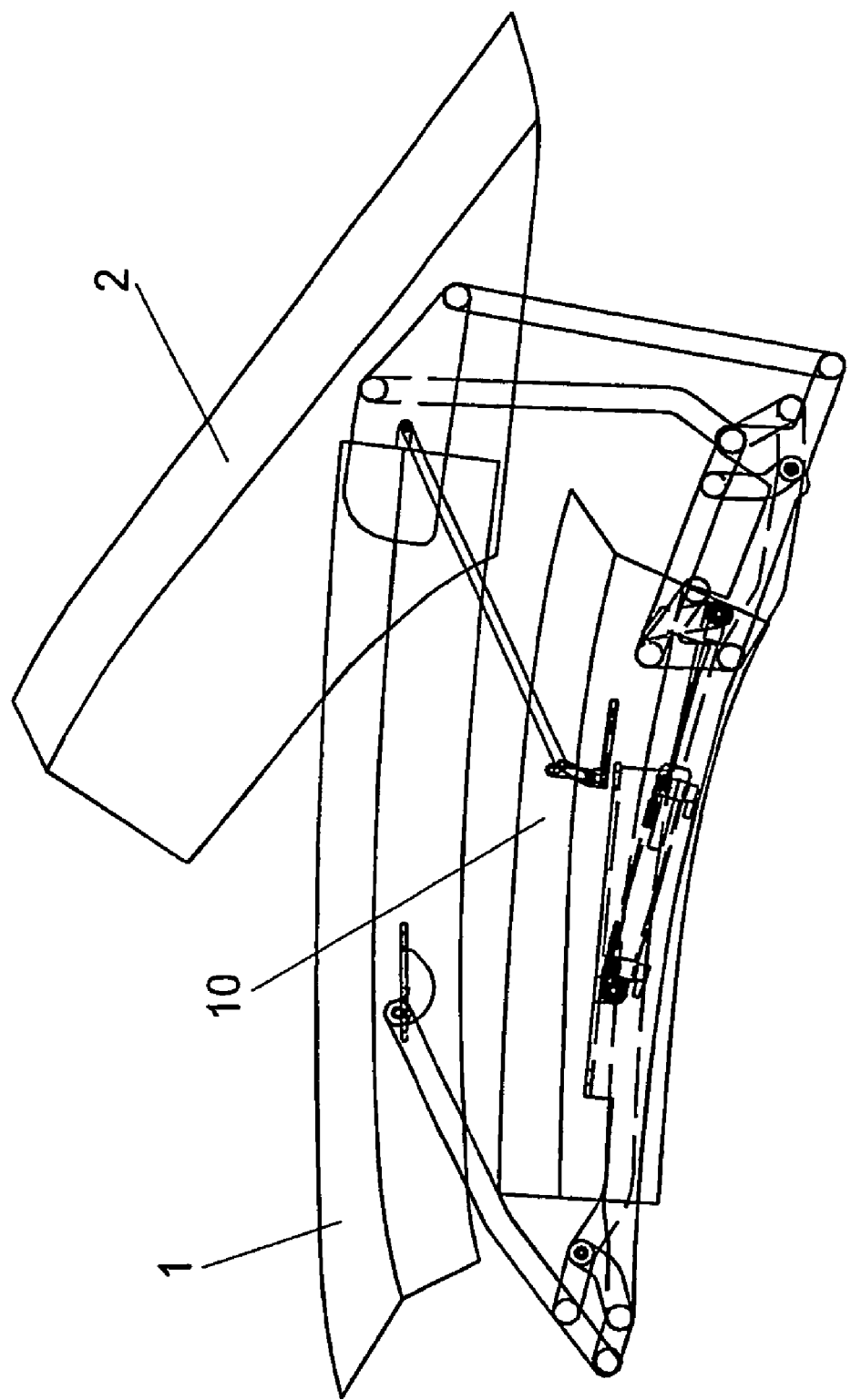
FIG. 7 shows a schematic partial view, from the side, of a first exemplary embodiment of a folding top according to the invention in a third step of an opening movement.
Figure 8:
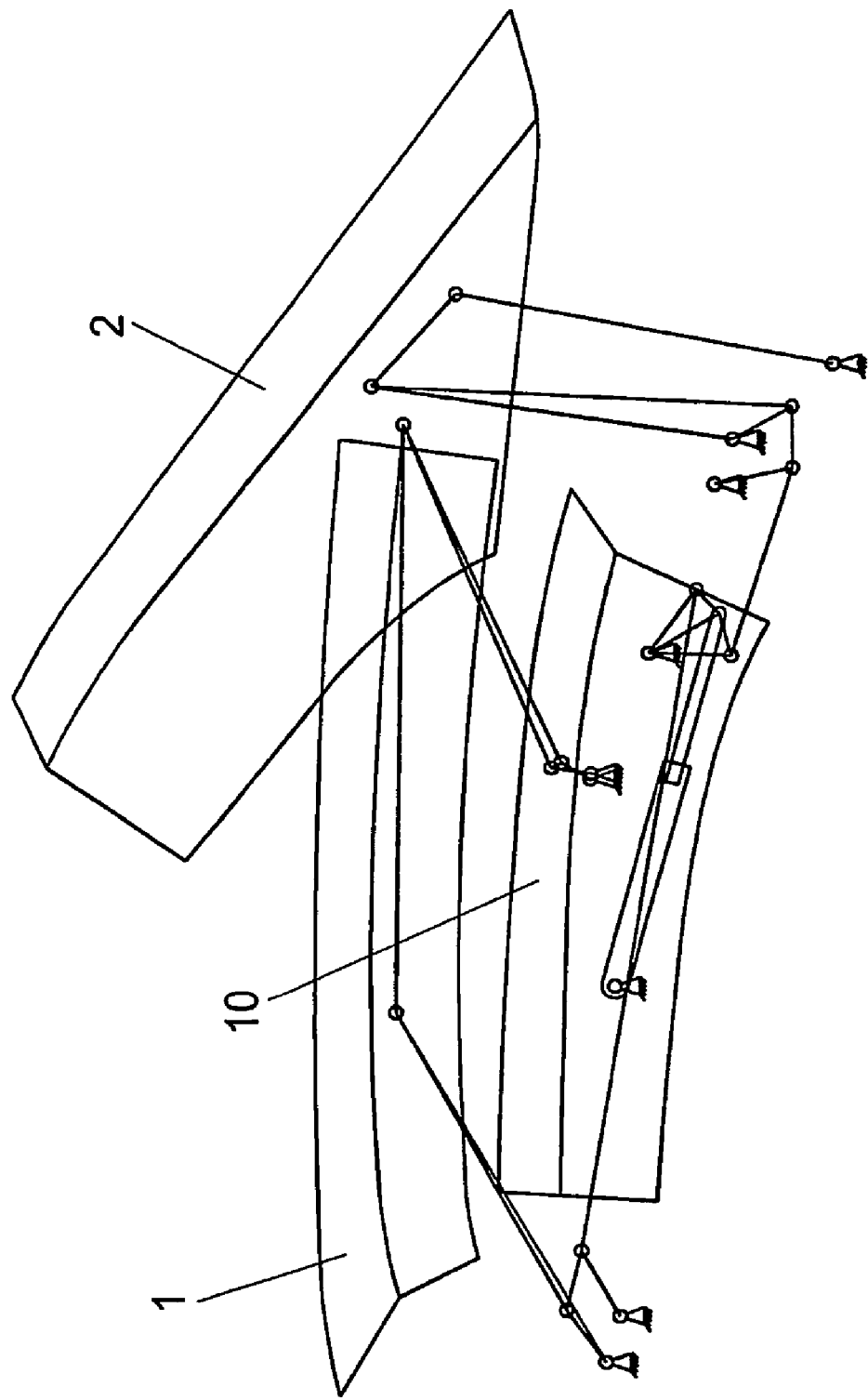
FIG. 8 shows the folding top from FIG. 7 in a basic illustration depicting the interaction of the components.

In the first instance, it is thus predominantly the case that the front roof part 1 pivots over the central roof part 10. The pivoting of the front roof part 1 prevails in the movement sequence approximately up to the position which is illustrated in FIGS. 5 and 6.

The relative movement of the front roof part 1, which has already been pivoted to a significant extent over the central roof part 10, subsequently slows down. At the same time, the movement of the rear roof part 2 increases since (for example from the position which is shown in FIGS. 5 and 6) a very direct conversion of the rotary movement of the rotary link 7 into a longitudinally directed movement of the rear control link 9a then takes place. The abovedescribed movement sequence of the two roof parts may thus be referred to as quasi-sequential.

Figure 9:
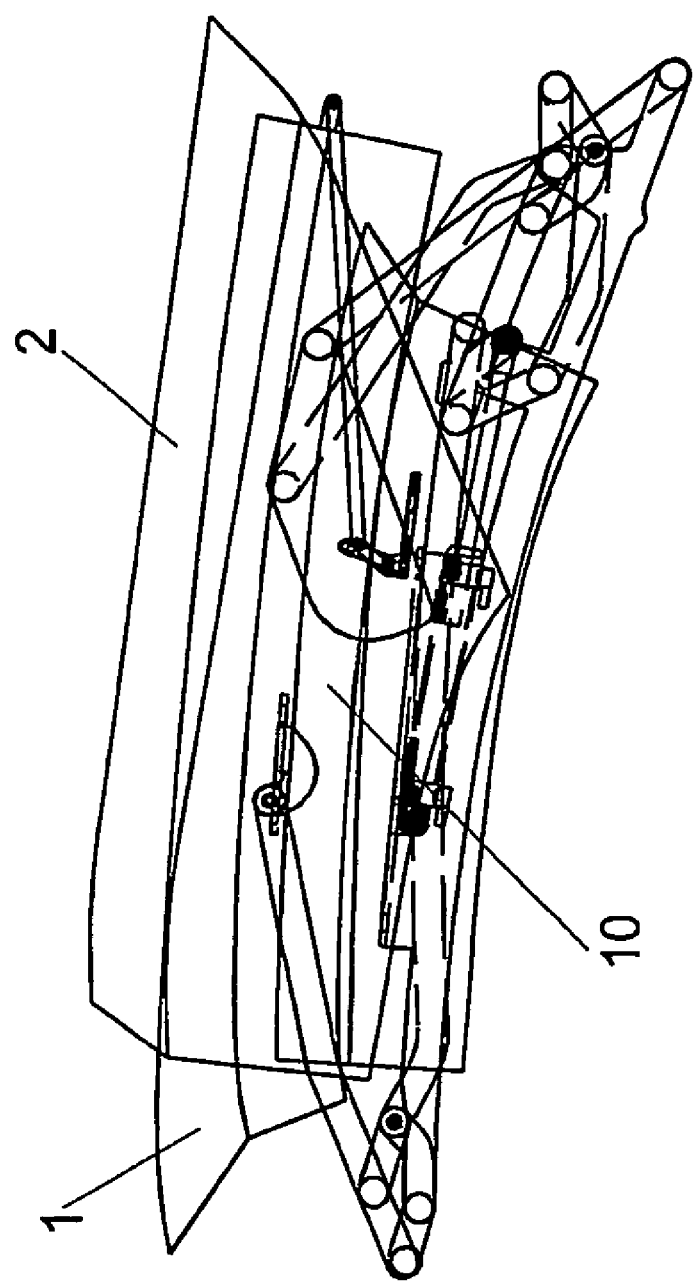
FIG. 9 shows a schematic partial view, from the side, of a first exemplary embodiment of a folding top according to the invention in a fourth step of an opening movement.

The first part of the folding-top opening movement is at an end when the three roof parts 1, 2 and 10 are arranged entirely in the form of a stack (see FIGS. 9, 10 and 12).

Figure 13:
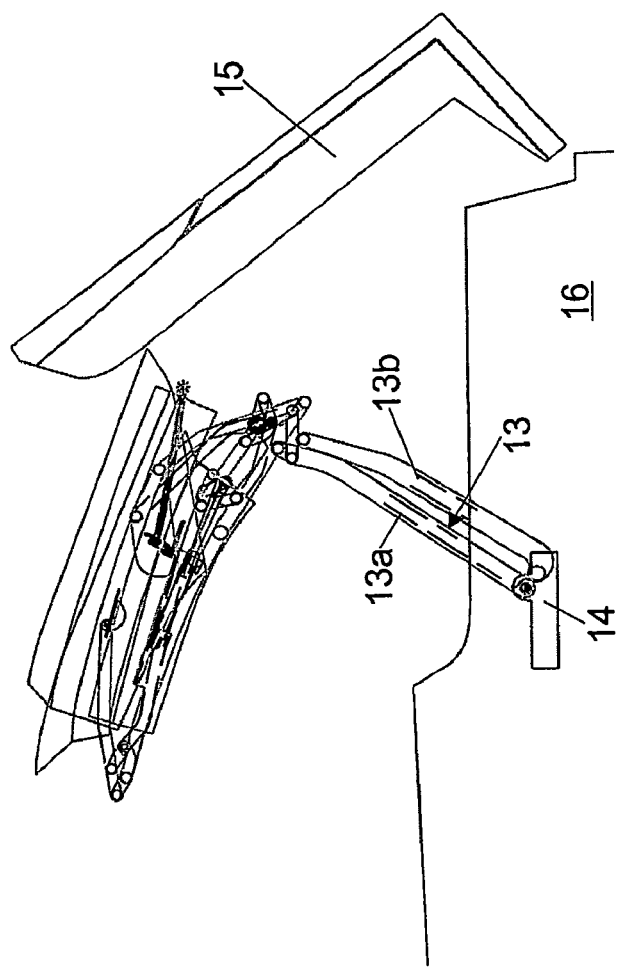
FIG. 13 shows the folding top from FIG. 12 in a further step of an opening movement.

A second part of the folding-top opening movement is illustrated in the overall views of the folding top according to FIGS. 12 to 14. In this case, pivoting of the main four-bar mechanism 13 driven by a second drive device displaces the previously formed stack of roof parts 1, 2, 10 into a rear stowage region 16 of the vehicle. For this purpose, the rear element 15 is first of all pivoted open counter to the direction of travel and then pivoted closed again.

A second exemplary embodiment of a folding top according to the invention is described hereinbelow:

The second exemplary embodiment of the folding top according to the invention comprises a first, front roof part 101 and a second, rear roof part 102. The second roof part 102 rests on a rear element 115 with sealing action from above when the folding top is closed, according to FIG. 18, and comprises a rear window and pillars of the folding-top located alongside the rear window. The rear element 115 comprises a front region 115a, as seen in the direction of travel, which is arranged within the passenger compartment, and thus beneath the second roof part 102, when the folding top is closed. The region 115a essentially corresponds to a rear-window shelf, arranged beneath a rear window, in a conventional sedan with a solid roof.

The first, front roof part is connected in a releasable manner to a windshield frame 130 of the vehicle when the folding top is closed.

A main-link mechanism 113 is mounted on the bodywork of the vehicle by means of a main-bearing unit 114. This makes it possible, in particular, to construct the folding top as a module which can be prefabricated separately, since the main-bearing unit essentially constitutes the only connection between the movable roof parts and the rest of the vehicle which is to be fitted.

The main-link mechanism is designed as a four-bar mechanism, the main-bearing unit 114 or the bodywork of the vehicle forming the base of the four-bar mechanism. A first main link 113a and a second main link 113b form the links of the main-link mechanism or four-bar mechanism 113. A carrying link 110a forms the connecting rod of the main-link mechanism 113. The carrying link 110a extends both to the front and rear over the distance which is necessary for coupling the four-bar mechanism 113, and serves as a carrier for the roof parts 101 and 102. The carrying link 110a thus essentially corresponds to the central link 10a of the first exemplary embodiment. It can be seen from this that it is also possible for a central roof part to be additionally mounted on the carrying link 110a.

The first roof part 101 is mounted on the carrying link 110a in its front region by means of a first link mechanism 111, the first link mechanism being designed here as a four-bar mechanism and comprising a first front link 111a and a second front link 111b. The first roof part 101 or a link which is fixed to the first roof part 101 forms the connecting rod of the first link mechanism 111.

The second roof part 102 is mounted on the carrying link 110a in its rear region by means of a second link mechanism 112, the second link mechanism 112 being designed here as a four-bar mechanism and comprising a first rear link 112a and a second rear link 112b. The second roof part 102 or a link which is fixed to the second roof part 102 forms the connecting rod of the second link mechanism 112.

A control link 104 is articulated in each case on the first front link 111a and the second rear link 112b. This produces a positive control means 104 which connects the first link mechanism 111 and the second link mechanism 112 to one another in a positively controlled manner. A positively controlled link chain is thus formed overall, this chain comprising the first and the second front links 111a, 111b, the first roof part 101, the first and the second rear links 112a, 112b, the second roof part 102, the carrying link 110a and the positive control means 104. As an alternative to the positive control means 104 being designed as a straightforward control link 104, it is also possible to provide a more complex mechanism according to the first exemplary embodiment as the positive control means, for example the positive control means 4, which is shown in the first exemplary embodiment, with the integrated control device 6 for delaying the movement of the roof parts 101, 102, relative to one another.

A drive arrangement (not illustrated) for moving the roof parts 101, 102 relative to one another can easily be provided as a linear force-introduction unit which is supported against two suitable links of the previously described positively controlled link chain.

In the present exemplary embodiment, the rear element is designed in two parts, an articulation being provided between the rear-window-shelf region 115a and the rest of the rear element 115. A particularly large trunk lid which can be pivoted open in the direction of travel is thus formed, as can be seen from FIG. 27 in particular. This practice of dividing up the rear element in the region of the rear-window shelf, however, does not in any way correspond with the separately pivotable rear-window shelf which is known from the prior art for the purpose of releasing a space for the movement of the folding top. In the closed folding-top arrangement according to FIGS. 18 and 27, the rear-window-shelf region 115a cannot be pivoted.

Figure 18:
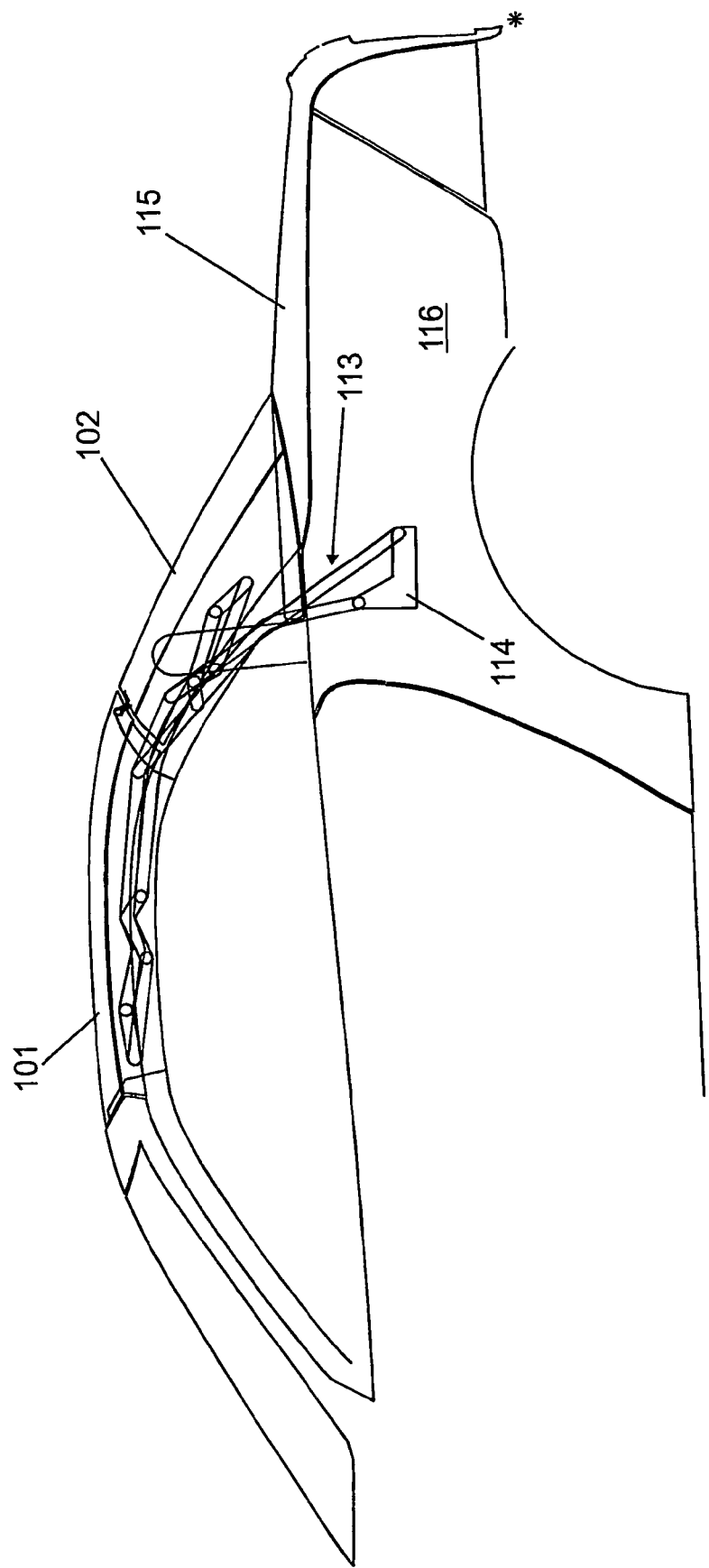
FIG. 18 shows a schematic view, from the side, of a second exemplary embodiment of a folding top according to the invention.
Figure 19:
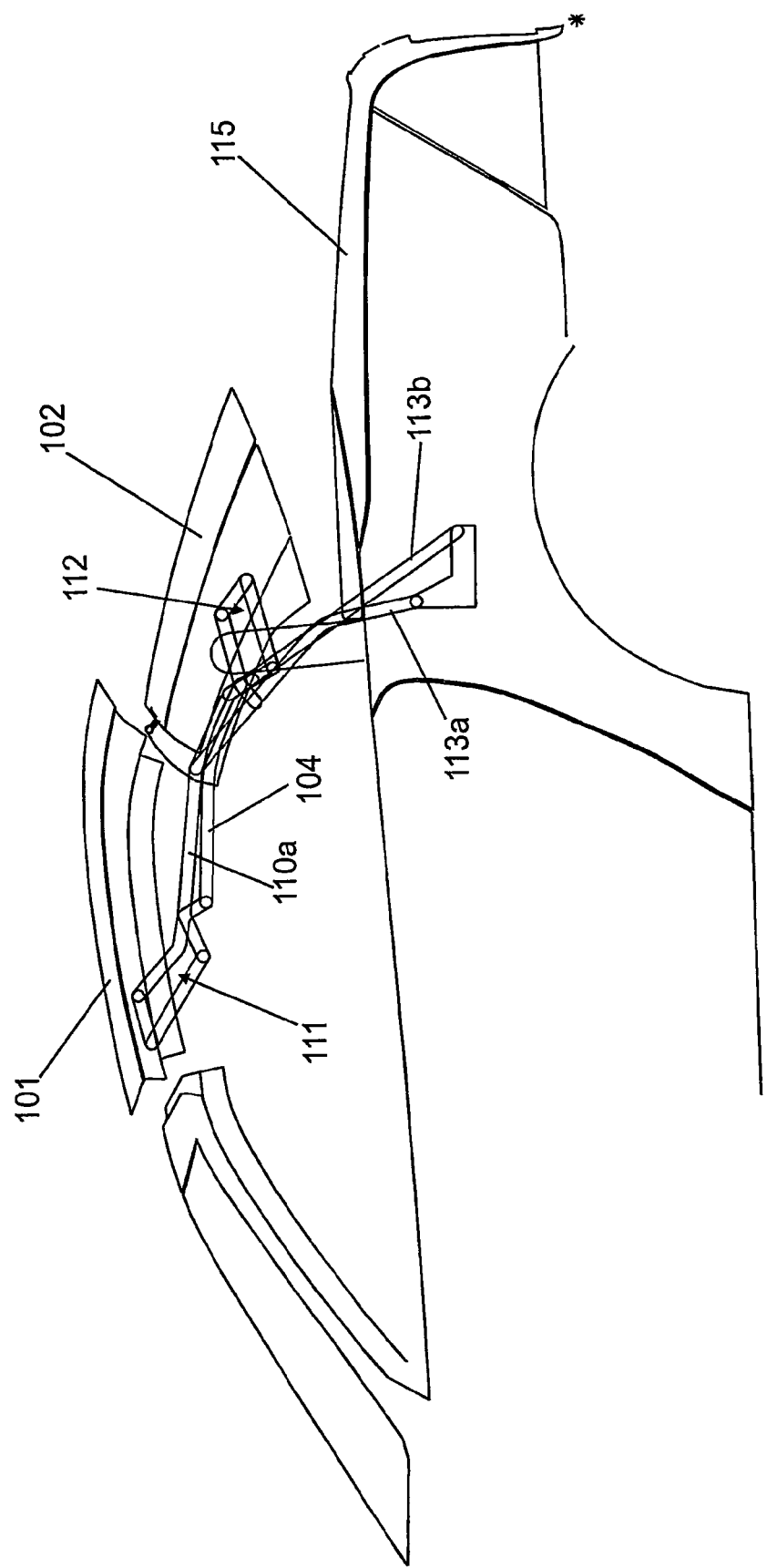
FIG. 19 shows the folding top from FIG. 18 following a first step of a folding-top opening movement.
Figure 20:
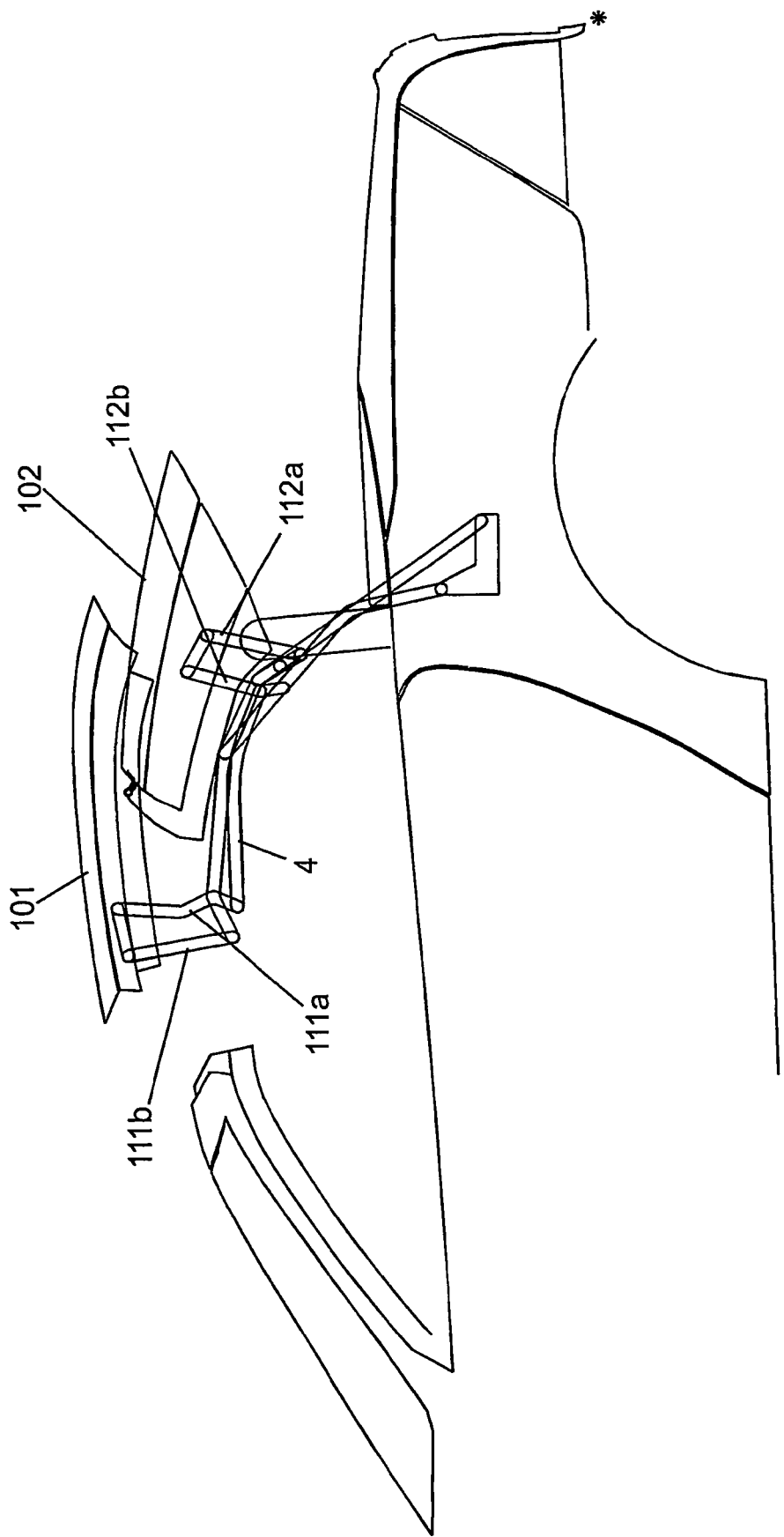
FIG. 20 shows the folding top from FIG. 18 following a second step of a folding-top opening movement.
Figure 21:
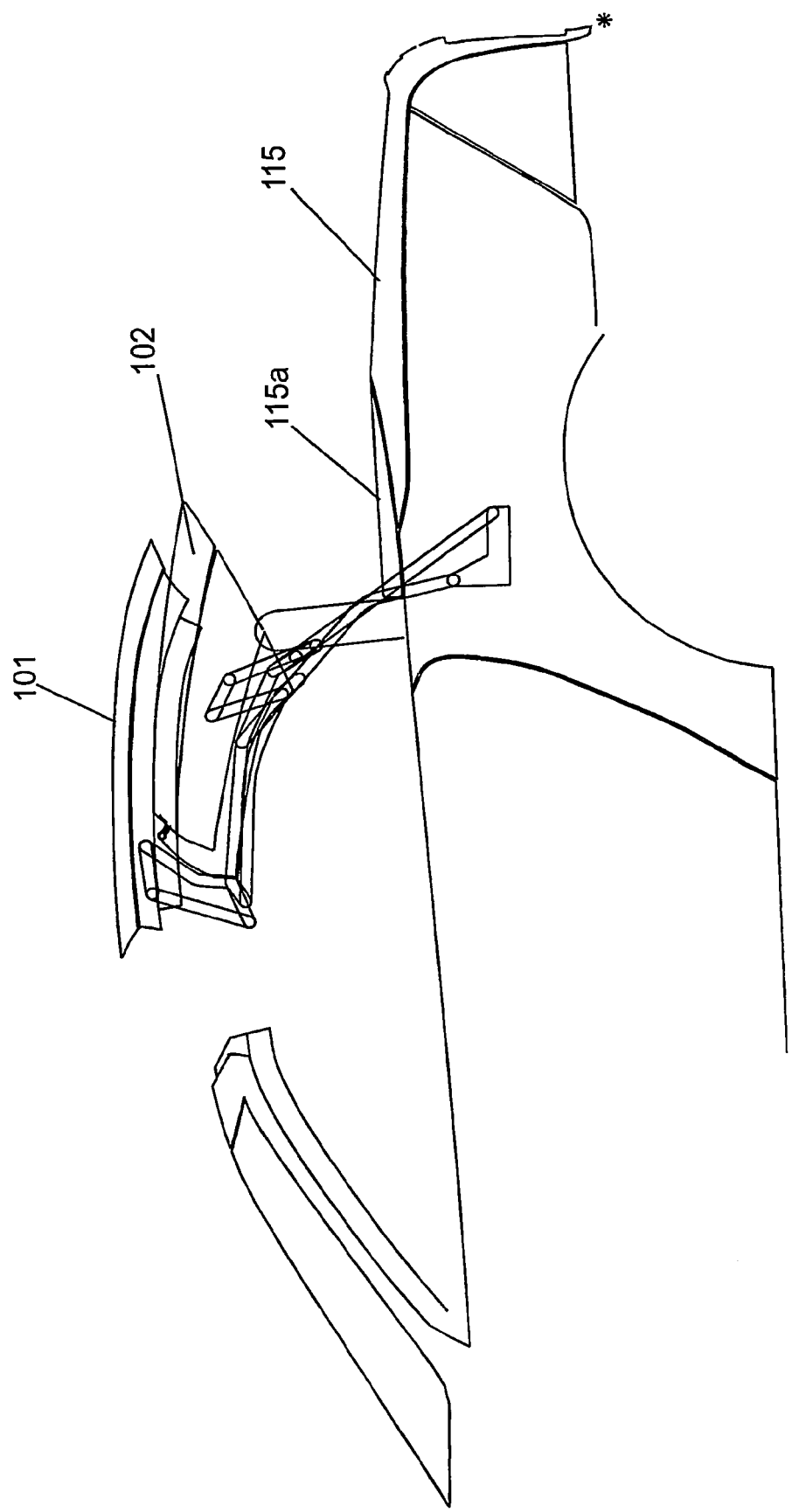
FIG. 21 shows the folding top from FIG. 18 following a third step of a folding-top opening movement.

The invention functions, then, as follows:

Starting from the closed folding-top position according to FIG. 18, in the first instance, a first stage of movement of the roof opening is initiated by means of a first force-introduction unit (not illustrated), the main-link mechanism 113 staying in the same position. It can be seen from FIGS. 19 to 21 that the second roof part 102 is pivoted in the direction of travel in the first instance by the driven movement of the previously described positively controlled link chain, the second roof part raising up from the rear element and being moved away upward, and in the direction of travel, from the rear element.

At the same time, the first roof part 101 is pivoted rearward, counter to the direction of travel, away from the windshield frame, with the result that the roof parts 101, 102 move toward one another, in which case they essentially maintain their spatial orientation. The first, front roof part 101 here is pivoted over the second, rear roof part 102 until a stacked position of the roof parts according to FIG. 21 has been reached. The stack of roof parts is connected to the vehicle via the main-link mechanism 113.

Figure 22:
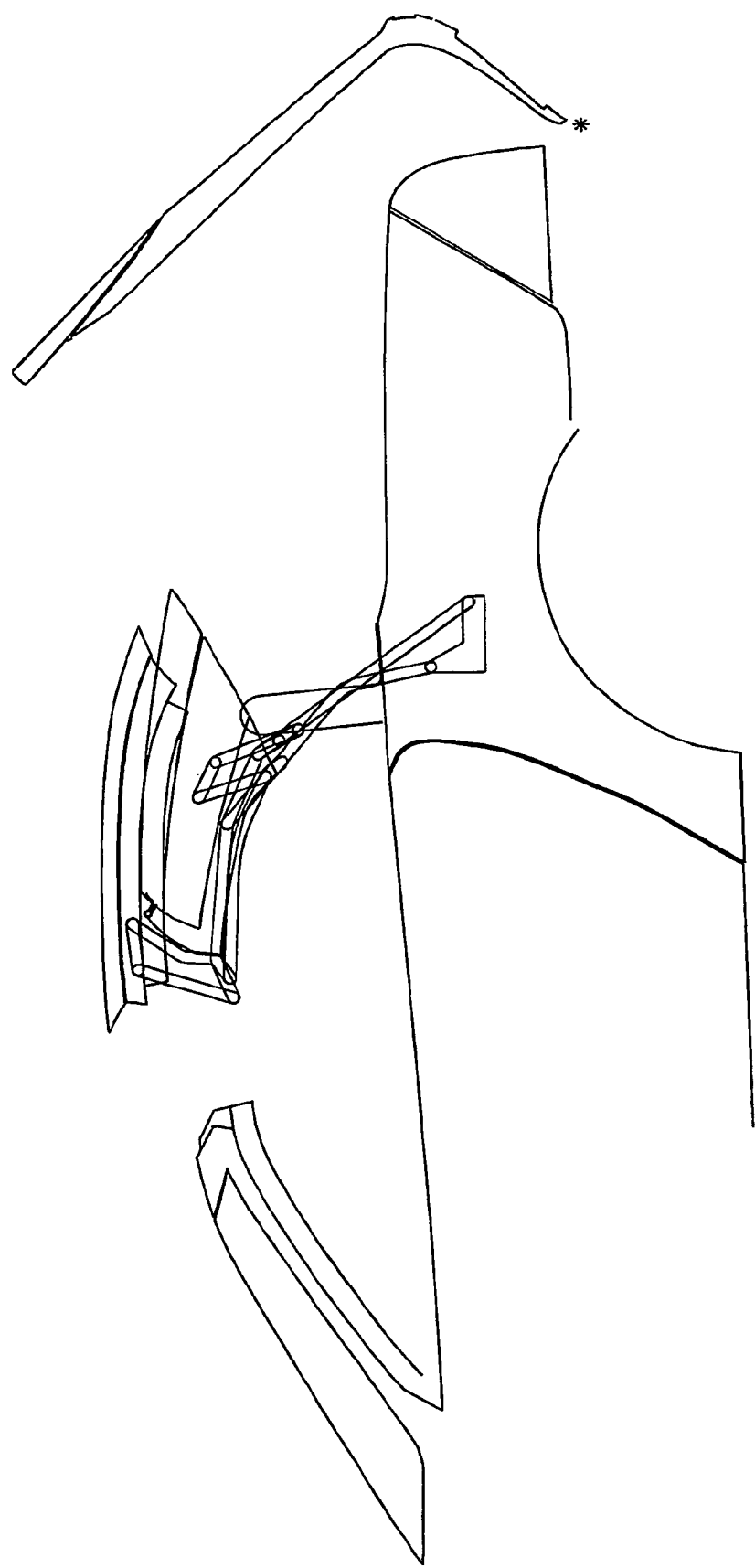
FIG. 22 shows the folding top from FIG. 18 following a fourth step of a folding-top opening movement.

The rear element 115 is then pivoted open counter to the direction of travel (see FIG. 22), in which case in particular the region 115a of the rear element 115 is pivoted along integrally. This is made possible by the previously described movement of the second roof part 102, as a result of which the movement space for the rear element 115 has been released.

Figure 23:
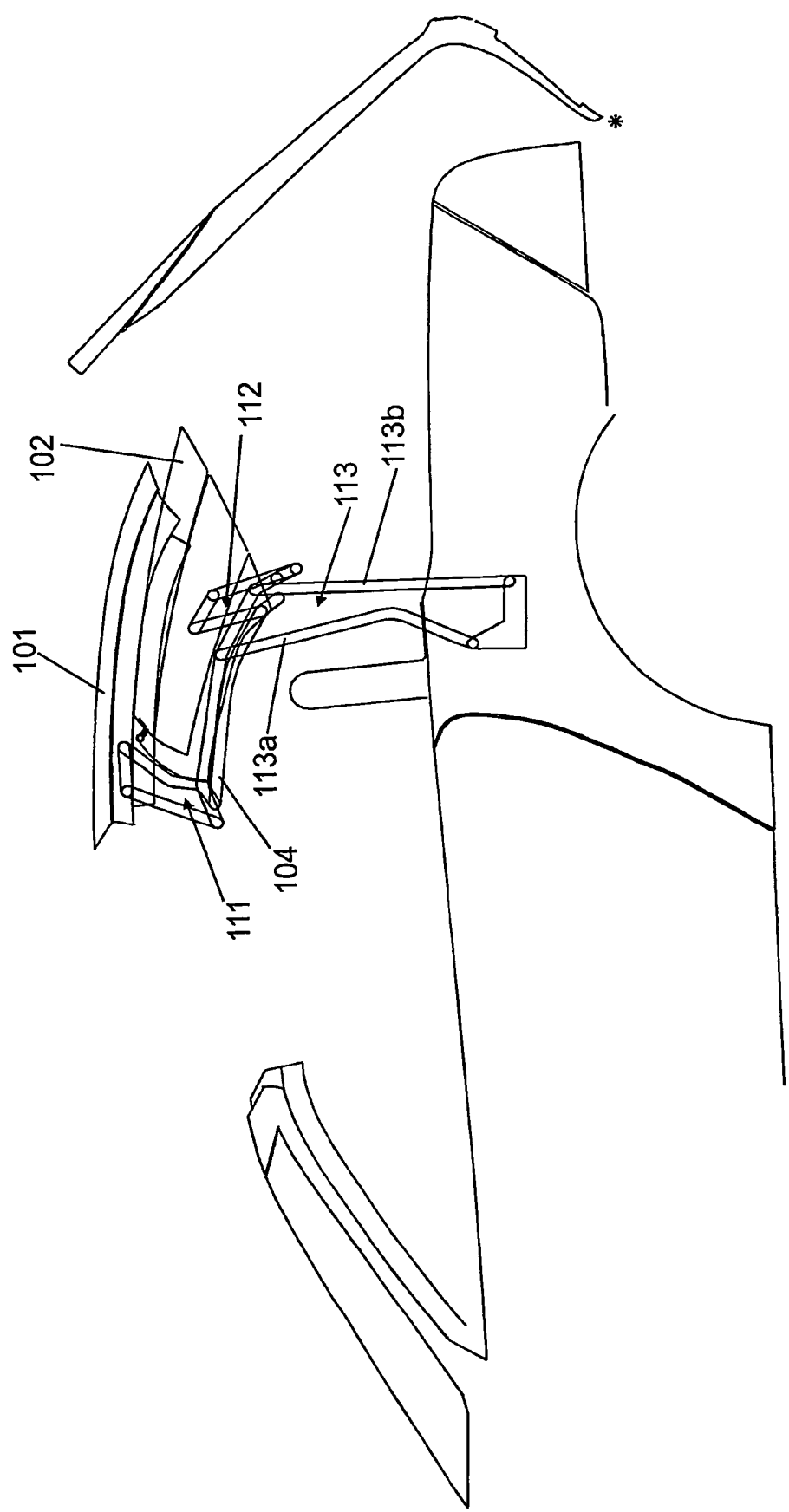
FIG. 23 shows the folding top from FIG. 18 following a fifth step of a folding-top opening movement.
Figure 24:
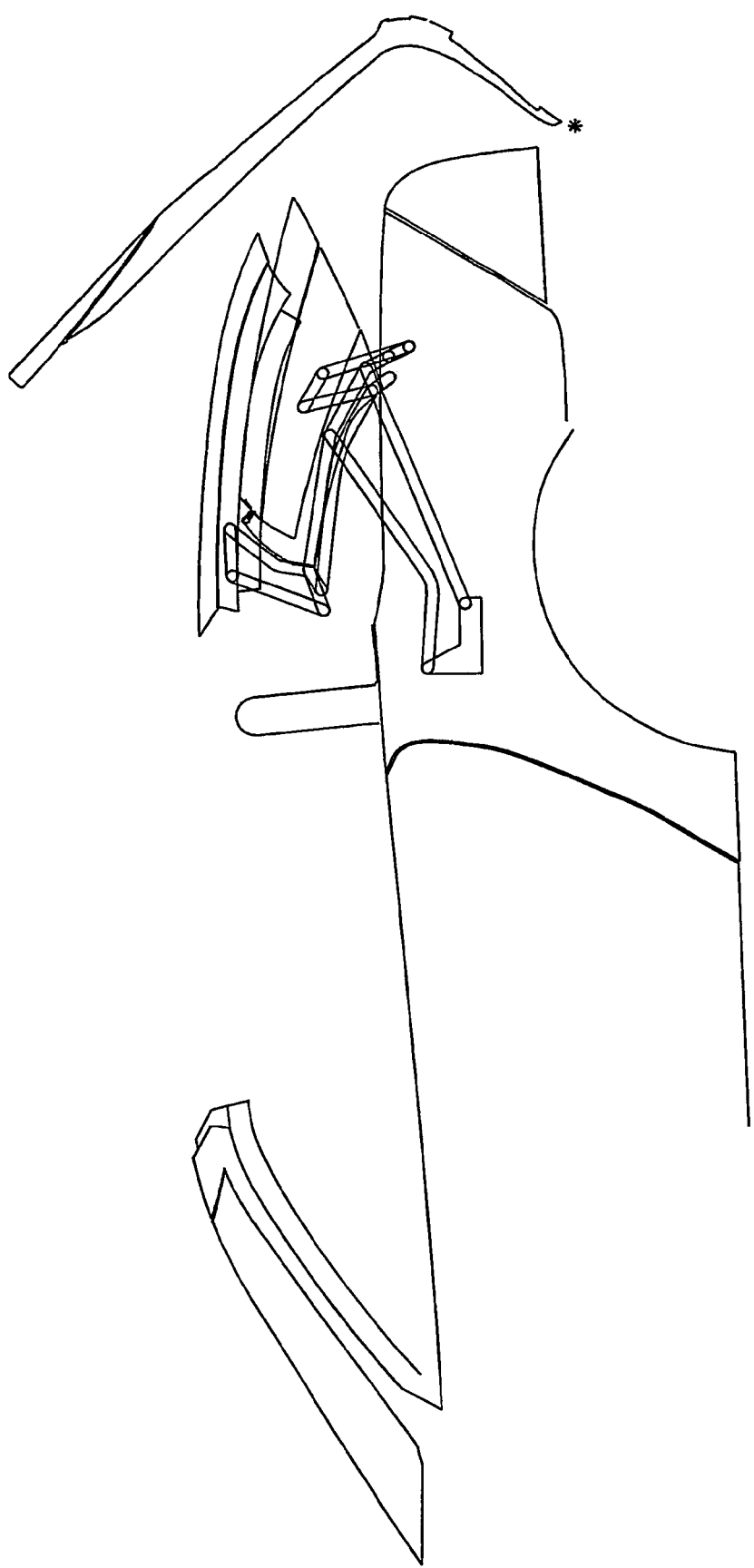
FIG. 24 shows the folding top from FIG. 18 following a sixth step of a folding-top opening movement.
Figure 25:
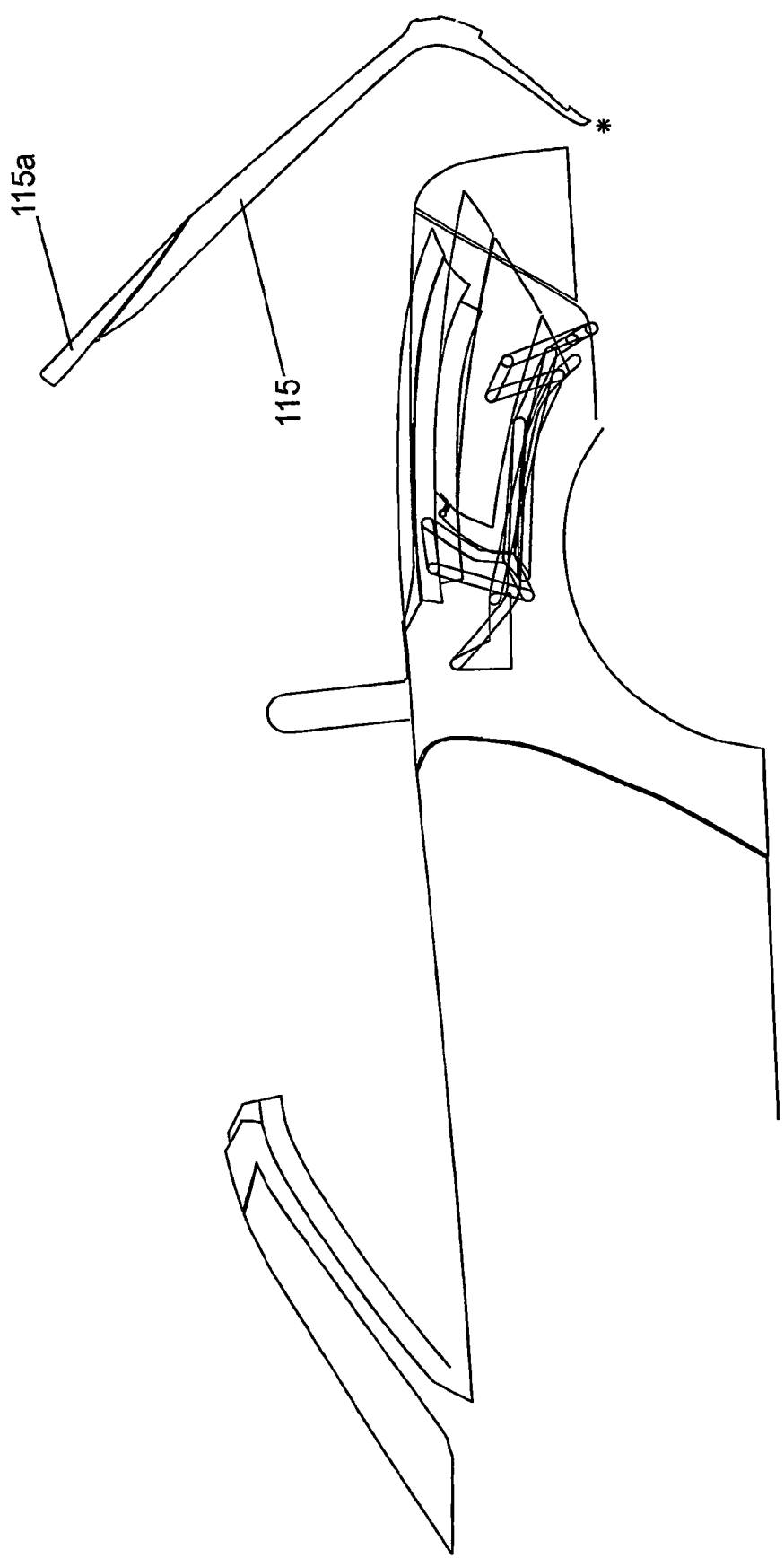
FIG. 25 shows the folding top from FIG. 18 in a fully open state, the folding top having been stowed in a rear stowage region of the vehicle.

Once a rear stowage region 116 for the folding top has thus been released, the main-link mechanism 113 is moved by means of a second drive device (not illustrated). According to the movement steps shown in FIGS. 23 to 25, the stack of roof parts here is displaced over an arcuate path of motion into the rear stowage region 116.

The rear element 115 is then closed again (see FIG. 26), in which case it covers over the stowed roof. In particular, the front region 115a of the rear element 115 adjoins a rear seat back 131, as is also the case when the folding top is closed.

Figure 26:
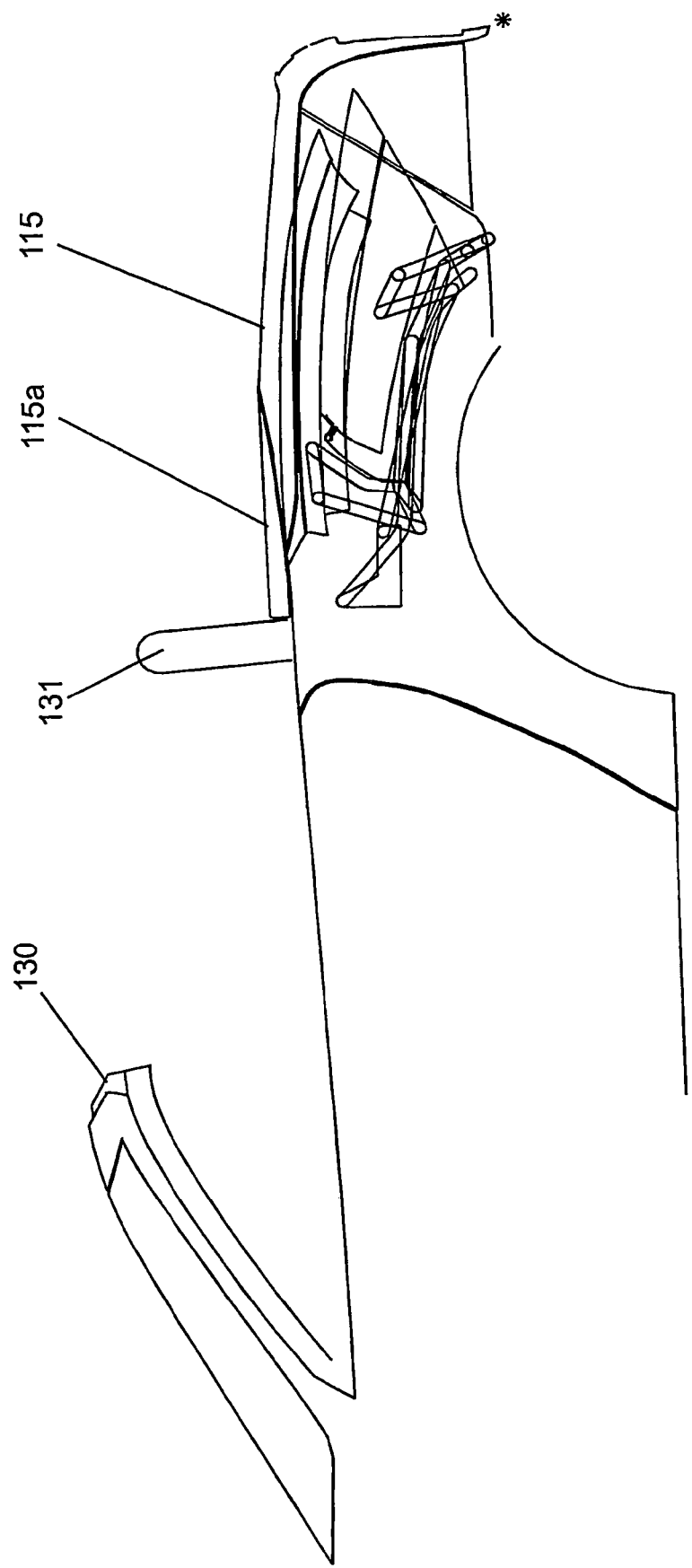
FIG. 26 shows the folding top from FIG. 25 with the rear element closed.

It can be seen from the open state of the folding top according to FIG. 26 that a useful trunk volume remains beneath the lowermost, second roof part 102.

For the closing operation of the folding top, the previously described kinematics take place in reverse order.

The invention claimed is:

1. A folding top for a cabriolet vehicle having a bodywork, the folding top comprising:
   a first roof part including a rigid shell part and being pivotable relative to the bodywork;
   a second roof part including a rigid shell part and being pivotable relative to the bodywork;
   a positive control means including a first linkage, a second linkage and a mechanical control device;
   the first linkage connecting the control device and the first roof part;
   the second linkage connecting the control device and the second roof part; and
   a common force-introduction unit configured to driveably move the first and second roof parts using the positive control means, wherein the control device is configured to enable a delay in a movement of the second roof part relative to a movement of the first roof part.

2. The folding top as recited in claim 1, wherein the control device includes a rotary link.

3. The folding top as recited in claim 2, wherein the force-introduction unit is configured to drive the rotary link.

4. The folding top as recited in claim 1 wherein the first roof part is a front roof part and the second roof part is a rear roof part of the folding top, and further comprising a central roof part disposed between the first roof part and the second roof part when the folding top is closed.

5. The folding top as recited in claim 4, further comprising a front four-bar mechanism connecting the first roof part to the central roof part and a rear four-bar mechanism connecting the second roof part to the central roof part.

6. The folding top as recited in claim 5, further comprising a main four-bar mechanism connecting the central roof part to the bodywork.

7. The folding top as recited in claim 5 wherein the front four-bar mechanism includes an outside link disposed adjacent an outside of the central roof part when the folding top is closed.

8. The folding top as recited in claim 7, further comprising a small four-bar mechanism connecting the outside link to the central roof part.

9. The folding top as recited in claim 1, wherein the control device includes a rotatable control plate.

10. The folding top as recited in claim 1, wherein the first roof part is releasably securable on a windshield frame of the vehicle when the folding top is closed.

11. The folding top as recited in claim 1, further comprising a third roof part disposed as a central roof part between the first roof part and the second roof part when the folding top is closed.

12. The folding top as recited in claim 1, further comprising a third roof disposed as a front roof part in front of the first roof part when the folding top is closed and wherein the second roof part forms a rear roof part, and the first roof part forms a central roof part of the folding top.

13. The folding top as recited in claim 12, wherein the third roof part is mounted in a movable manner on the first roof part.

14. A folding top for a cabriolet vehicle having a bodywork, the folding top comprising:
   a first roof part including a rigid shell part and being pivotable relative to the bodywork;
   a second roof part including a rigid shell part and being pivotable relative to the bodywork;
   a positive control means including a mechanical control device;
   a common force-introduction unit configured to driveably move the first and second roof parts using the positive control means, wherein the control device is configured to enable a delay in a movement of the second roof part relative to a movement of the first roof part;
   a central roof part;
   a four-bar mechanism; and
   an outside link connected in an articulated manner via the four-bar mechanism to the central roof part and to the first roof part,
   the outside link being articulated on an outer side of the central roof part when the folding top is closed.

15. The folding top as recited in claim 14, wherein the outside link is disposed in a groove-like recess of the central roof part when the folding top is closed.

16. The folding top as recited in claim 14, wherein the outside link is pivotable by an angle of at least 150 degrees.

17. The folding top as recited in claim 16, wherein the outside link is pivotable by an angle of at least 160 degrees.

18. The folding top as recited in claim 14, wherein the four bar mechanism includes first and second links and further comprising a covering plate secured pivotably secured at an articulation so as to be pivotable essentially parallel to the first and second links.

19. The folding top as recited in claim 14, wherein the central roof part forms a base of the four-bar mechanism, and wherein the outside link forms a connecting rod of the four-bar mechanism.

20. The folding top as recited in claim 14, wherein the first roof part is pivotable to a position essentially parallel over the central roof part.

21. The folding top as recited in claim 14, wherein the second roof part rests on a rear element with sealing action from above when the folding top is closed.

22. The folding top as recited in claim 21, wherein, in a first stage of a folding-top opening movement, the second roof part can be raised up from the rear element.

23. The folding top as recited in claim 21, wherein the vehicle includes a stowage region for the folding top and wherein the rear element covers over the stowage region and can be pivoted open counter to the direction of travel.

24. The folding top as recited in claim 14, wherein the second roof part is displaceable to a position over the first roof part.

25. The folding top as recited in claim 14, wherein the control device includes a rotary link.

26. The folding top as recited in claim 25, wherein the force-introduction unit is configured to drive the rotary link.

27. The folding top as recited in claim 25, further comprising a first linkage connecting the rotary link to the first roof part and a second linkage connecting the rotary link to the second roof part.

28. A folding top for a cabriolet vehicle having a bodywork, the folding top comprising:
   a first roof part including a rigid shell part and being pivotable relative to the bodywork;
   a second roof part including a rigid shell part and being pivotable relative to the bodywork;
   a positive control means including a main link mechanism and a mechanical control device; and
   a common force-introduction unit configured to driveably move the first and second roof parts using the positive control means, the common force-introduction unit engaging the mechanical control device and the main link mechanism, wherein the control device is configured to enable a delay in a movement of the second roof part relative to a movement of the first roof part.

29. The folding top as recited in claim 28, wherein the control device includes a rotary link and further comprising a first linkage connecting the rotary link to the first roof part and a second linkage connecting the rotary link to the second roof part.

30. The folding top as recited in claim 28, further comprising a first link mechanism connecting the first roof part to the main-link mechanism and configured to displace the first roof part.

31. The folding top as recited in claim 28, wherein the second roof part is displaceable relative to the main-link mechanism.

32. The folding top as recited in claim 31, further comprising a second link mechanism connecting the second roof part to the main-link mechanism and configured to displace the second roof part.

33. The folding top as recited in claim 28, wherein the main-link mechanism includes a carrying link and wherein at least one of the first roof part and the second roof part is mounted on the carrying link.

34. The folding top as recited in claim 28, wherein first roof part and the second roof part are displaceable in opposite directions relative to one another and relative to the main-link mechanism.

35. A folding top for a cabriolet vehicle having a bodywork, the folding top comprising:

a first roof part including a rigid shell part and being pivotable relative to the bodywork;

a second roof part including a rigid shell part and being pivotable relative to the bodywork;

a positive control means including a mechanical control device, the mechanical control device being arranged between the first roof part and the second roof part; and a common force-introduction unit configured to driveably move the first and second roof parts using the positive control means, wherein the control device is configured to enable a delay in a movement of the second roof part relative to a movement of the first roof part.

* * * * *